United States Patent [19]

Civardi et al.

[11] 4,341,581
[45] Jul. 27, 1982

[54] METHOD OF MAKING LEATHERLIKE MATERIALS (B)

[75] Inventors: Frank P. Civardi, Wayne; Milan J. Getting, Nutley, both of N.J.

[73] Assignee: Inmont Corporation, Clifton, N.J.

[21] Appl. No.: 41,780

[22] Filed: May 23, 1979

Related U.S. Application Data

[63] Continuation-in-part of Ser. No. 891,834, Mar. 30, 1978, abandoned.

[51] Int. Cl.³ .............................................. B32B 27/40
[52] U.S. Cl. .................................... 156/209; 156/219; 156/220; 156/277; 156/289; 428/105; 428/114; 428/151; 428/904; 428/315.5; 428/315.7; 428/315.9
[58] Field of Search ........... 156/219, 220, 243, 244.11, 156/277, 320, 321, 322, 209, 289; 427/261, 263, 270, 271, 288; 428/151, 304, 310, 311, 315, 317, 320, 904, 85, 88, 91, 105, 106, 114

[56] References Cited

U.S. PATENT DOCUMENTS

| | | | |
|---|---|---|---|
| 3,262,805 | 7/1966 | Aoki | 427/270 |
| 3,462,326 | 8/1969 | Steel et al. | 428/310 |
| 3,497,162 | 2/1970 | Critchfield et al. | 428/315 |
| 3,600,260 | 8/1971 | Watanabe | 156/220 |
| 3,640,829 | 2/1972 | Elton | 428/304 |
| 3,751,329 | 8/1973 | Saronno et al. | 428/310 |
| 3,860,680 | 1/1975 | Warwicker et al. | 428/151 |
| 3,941,633 | 3/1976 | Wang et al. | 156/243 |
| 4,002,792 | 1/1977 | Peterson et al. | 428/310 |

Primary Examiner—Caleb Weston
Attorney, Agent, or Firm—Michael R. Chipaloski; Abner Sheffer

[57] ABSTRACT

A system for the manufacture of leatherlike materials, particularly for shoe uppers, which avoids pollution, toxicity and fire hazards and makes it possible for the shoe manufacturer to make his shoe upper materials as required with a minimum of investment in inventory of raw materials and with simple, relatively inexpensive equipment.

18 Claims, 57 Drawing Figures

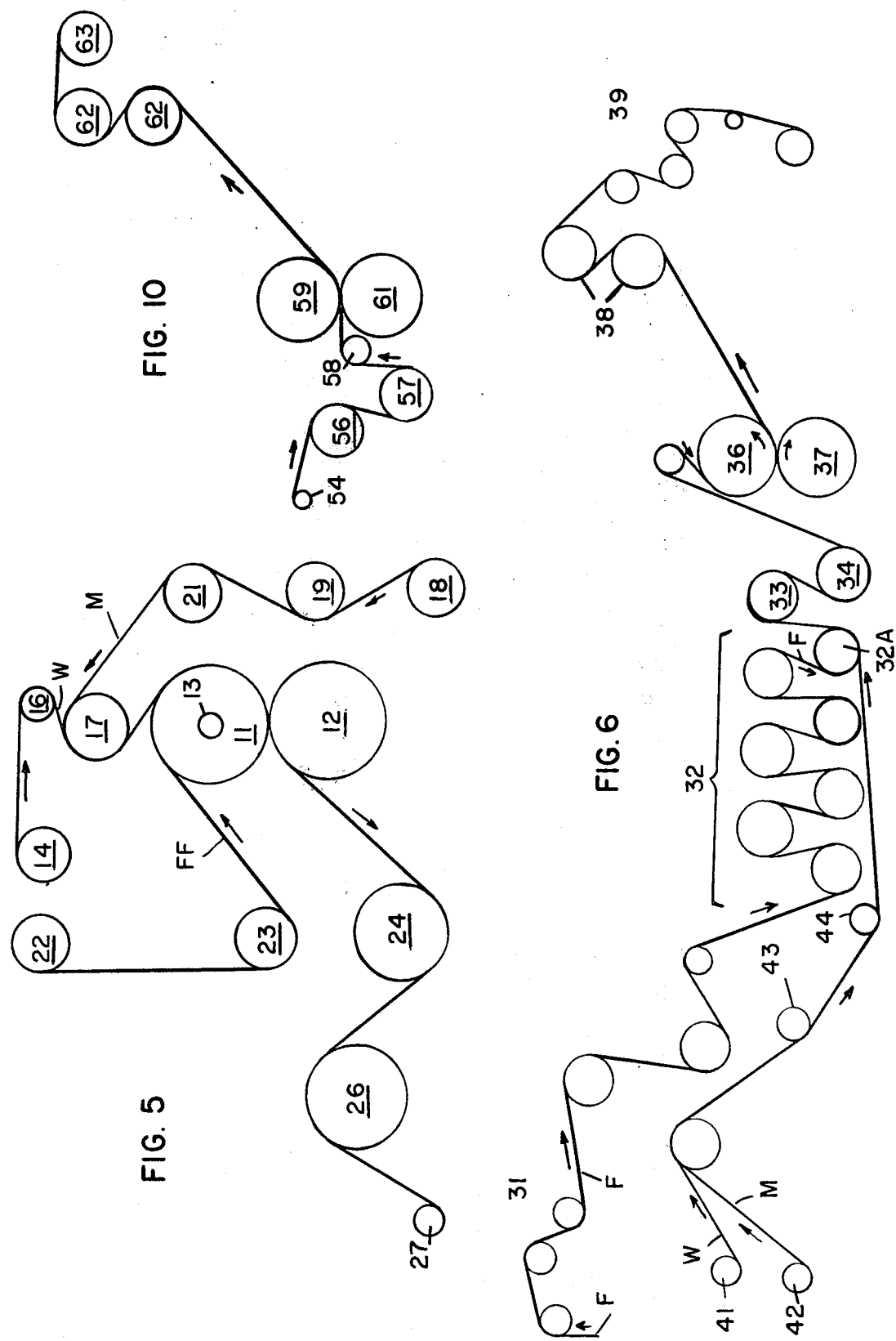

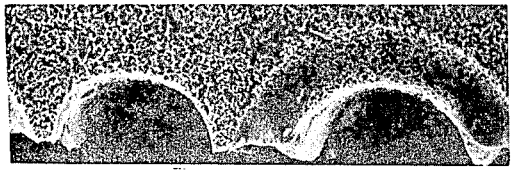
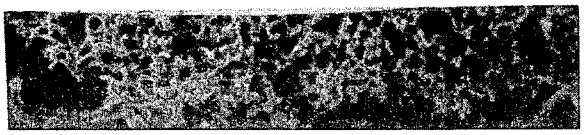
FIG 7  |←~0.3mm→|  51)  51)  |←0.3mm→|  FIG 9
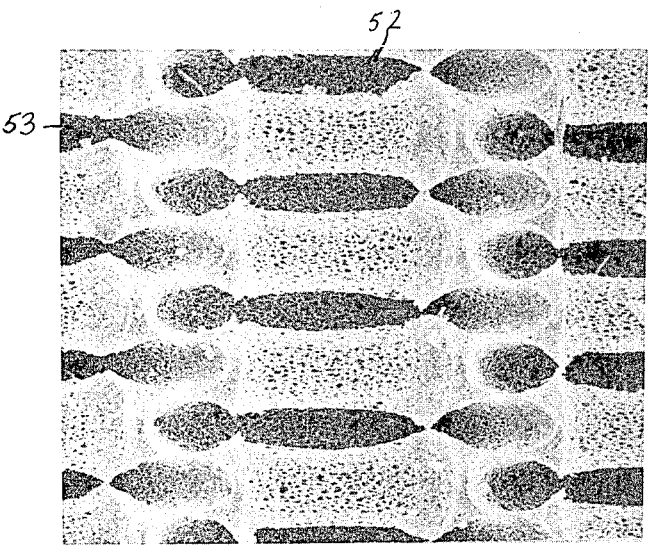
FIG 8
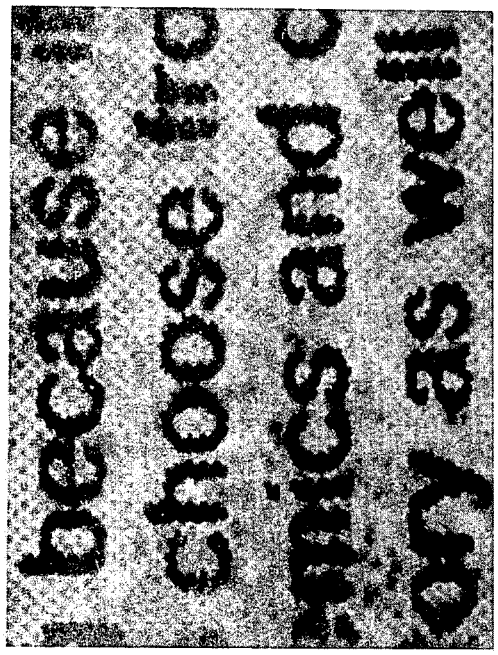
FIG 15
|←2mm→|
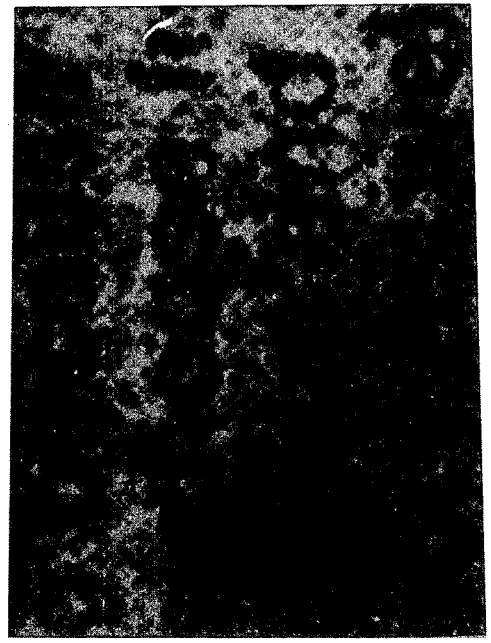
FIG 16

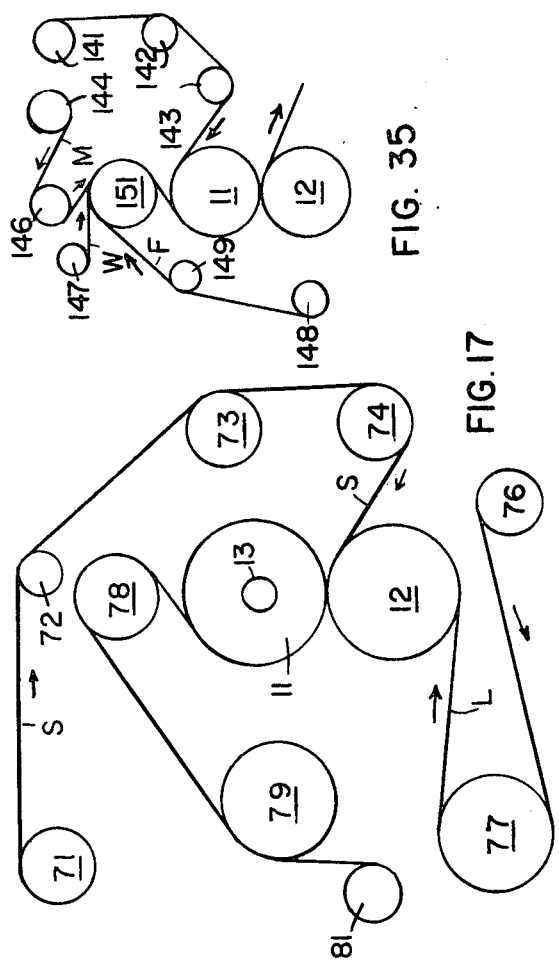
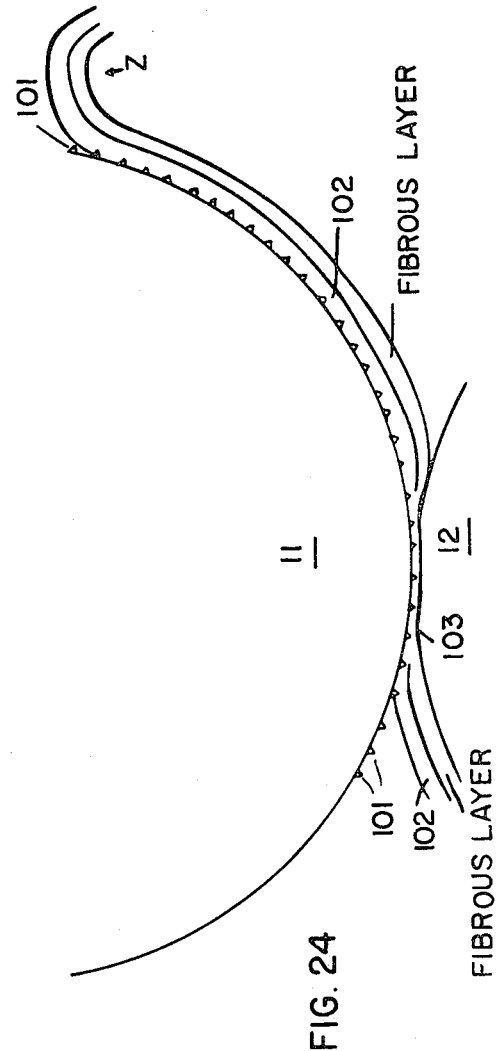
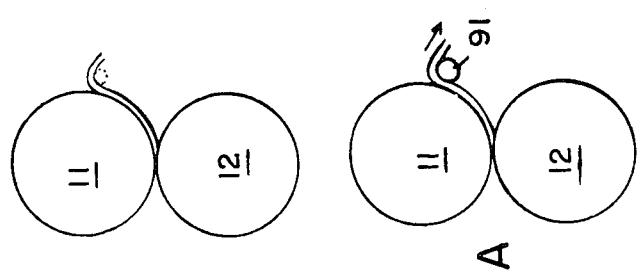

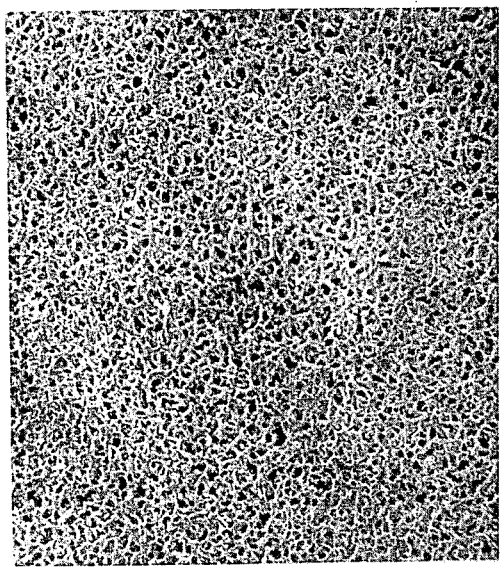
FIG 12  |←0.5mm→|
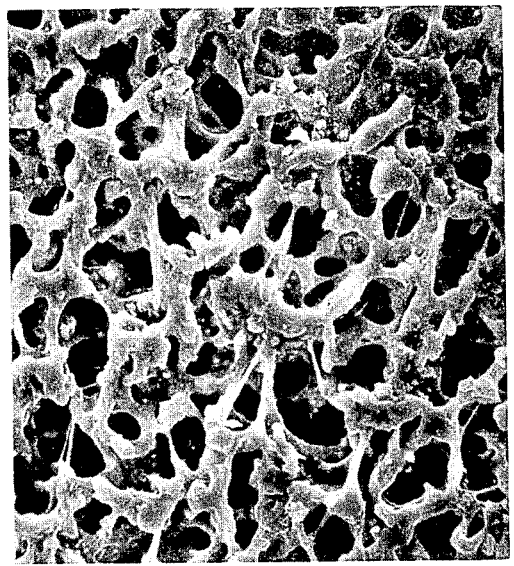
FIG 12A  |←0.1mm→|
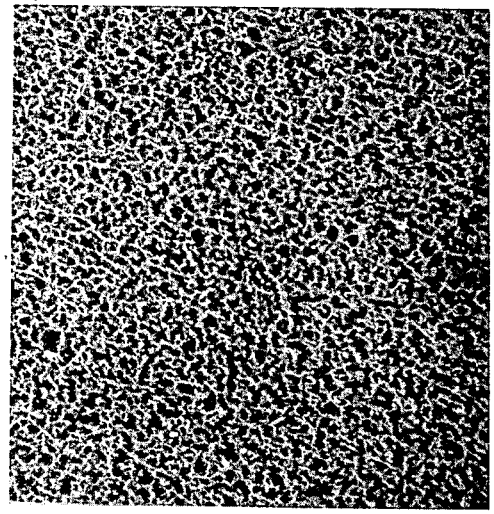
FIG 13
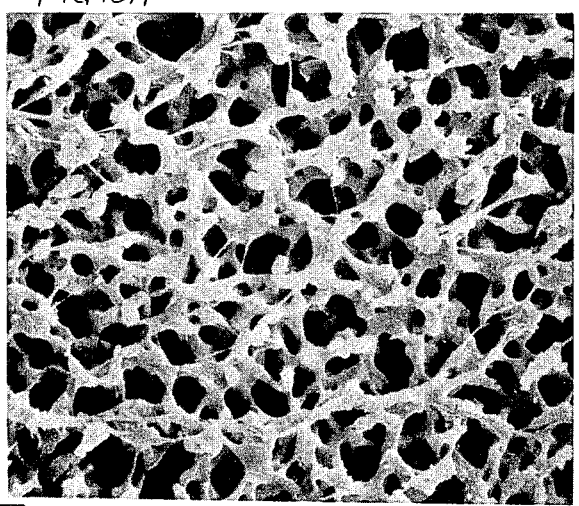
FIG 13A
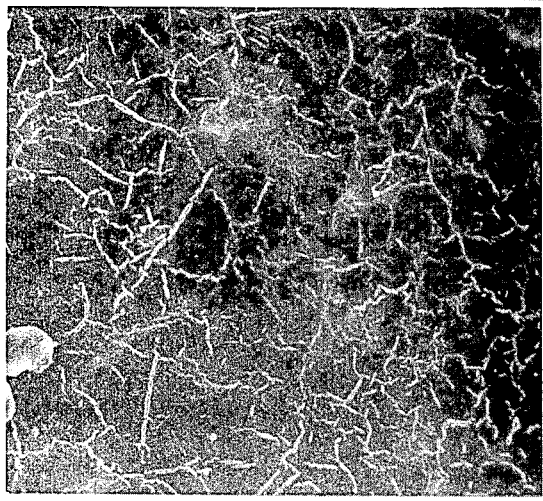
FIG 34  |←0.1mm→|

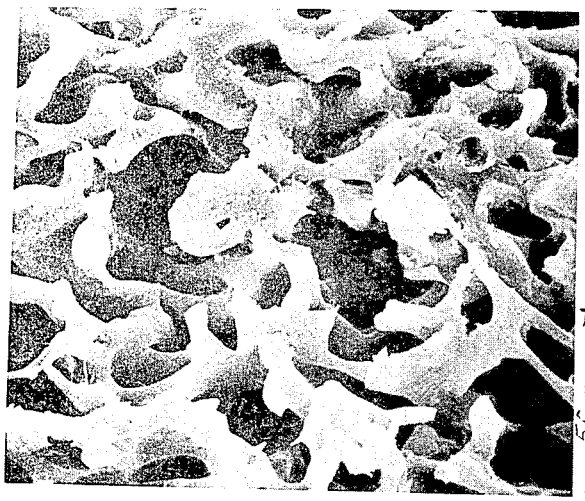
FIG 14
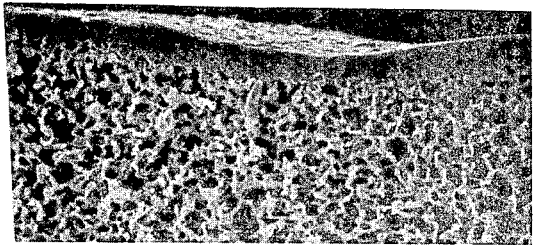
FIG 33 ⊢0.2mm⊣
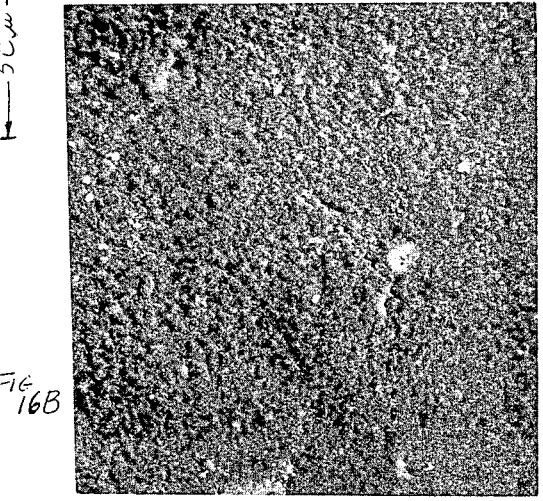
FIG 16B
⊢— 0.1mm —⊣ scale for 15B, 16B
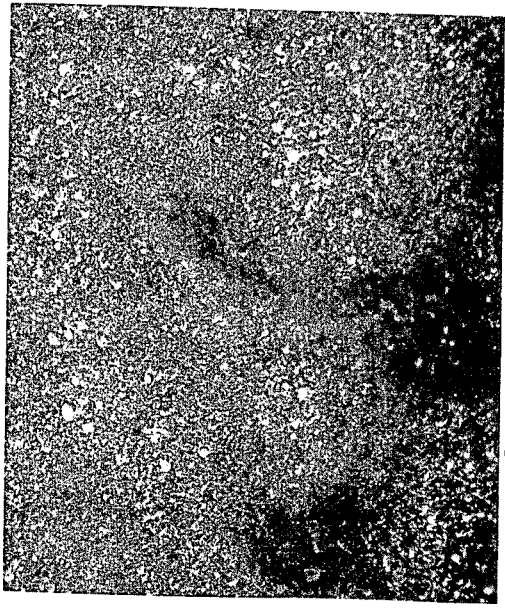
FIG 15B
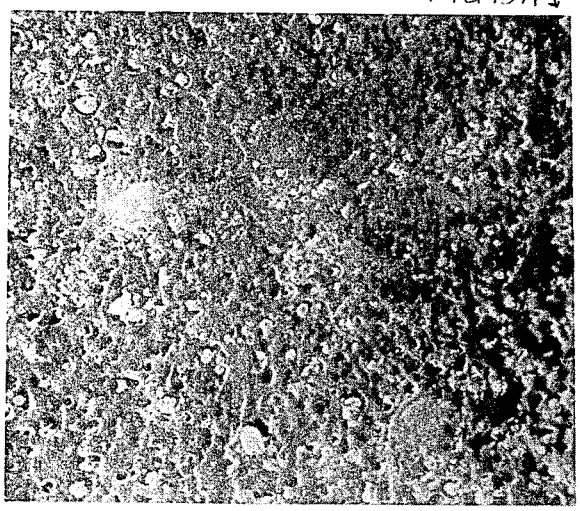
FIG 15A
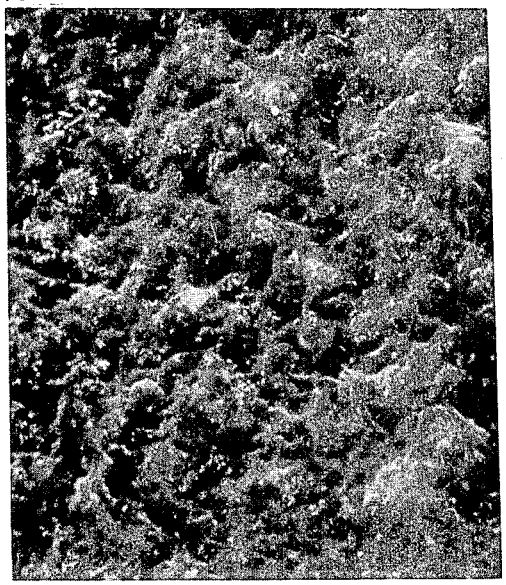
⊢10μ⊣ scale for 15A, 16A
FIG 16A

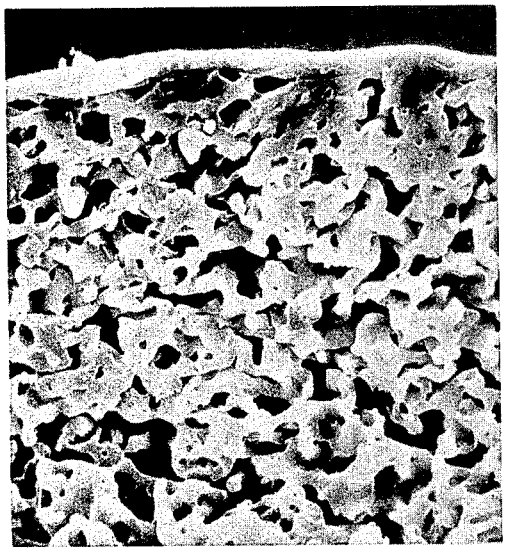
|←—50μ—→| FIG 18
|←—10μ—→| FIG 18A
|←0.5mm→| FIG 18B

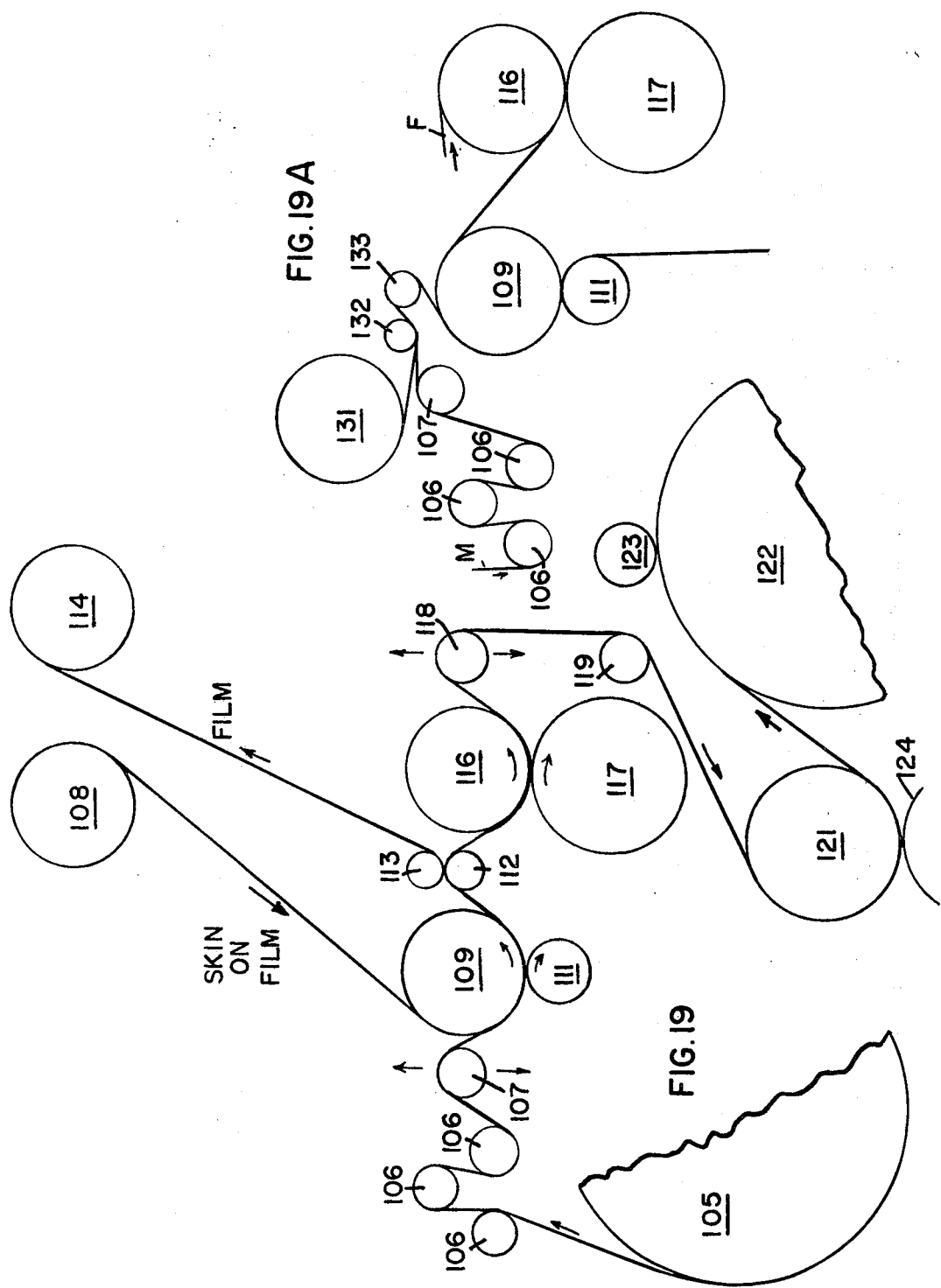

0.3mm

10μ

50μ

50μ

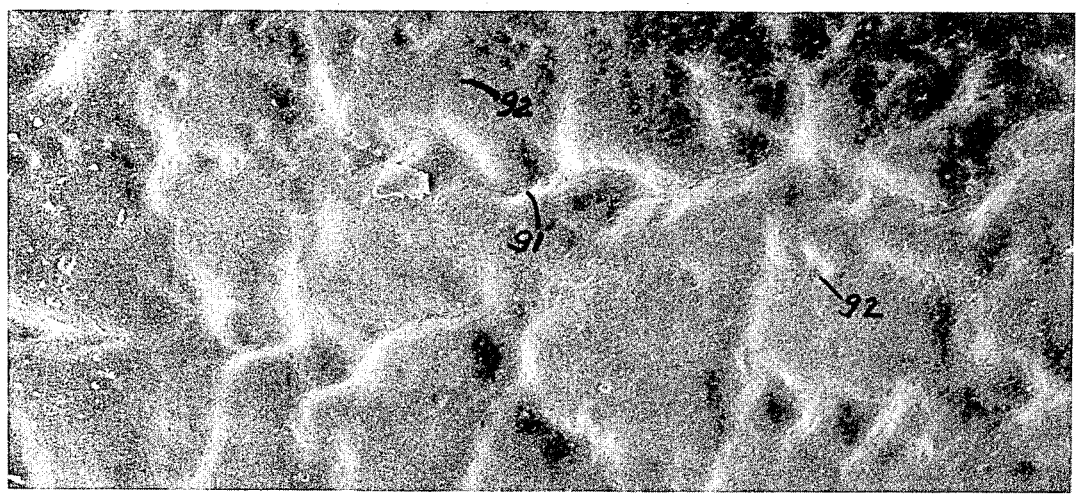
FIG 22  ⊢—0.5mm—⊣
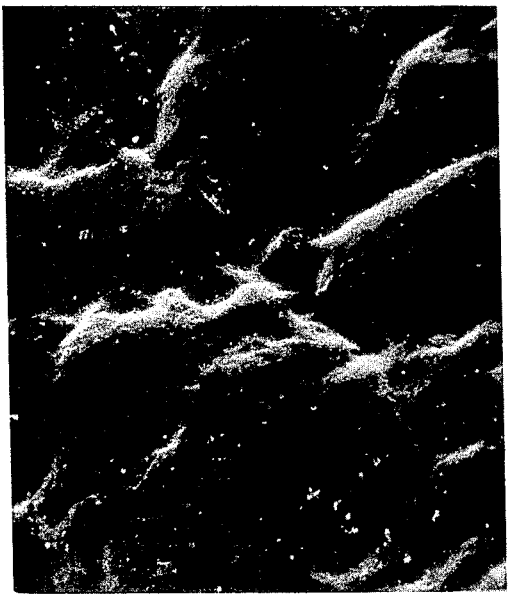 
FIG 23  ⊢—0.5mm—⊣  FIG 23A

|←—0.5mm—→|
same scale for all

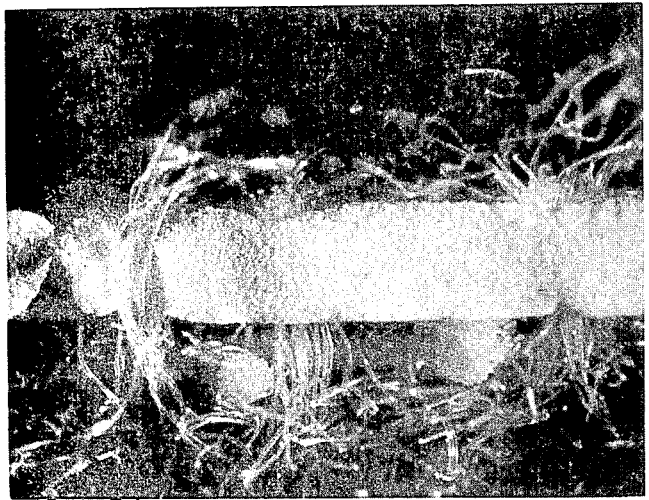
FIG 31 |←—1mm—→|
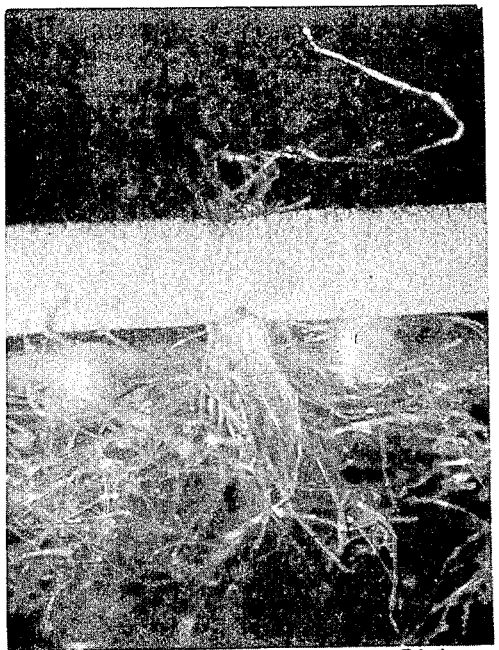
|←—1mm—→| FIG 31A
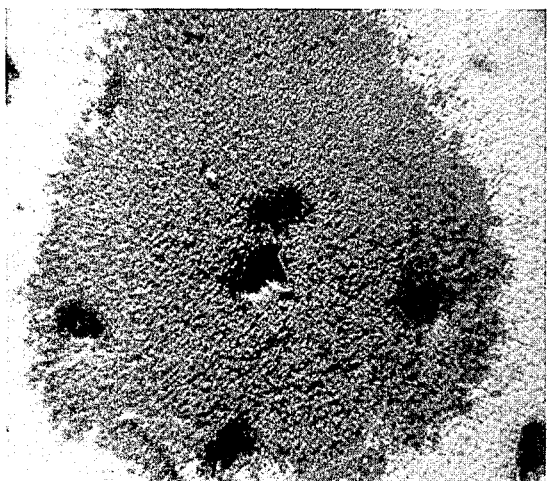
FIG 30
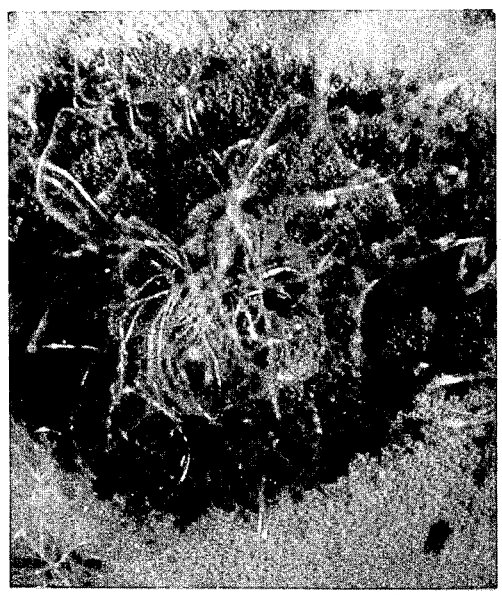
FIG 32
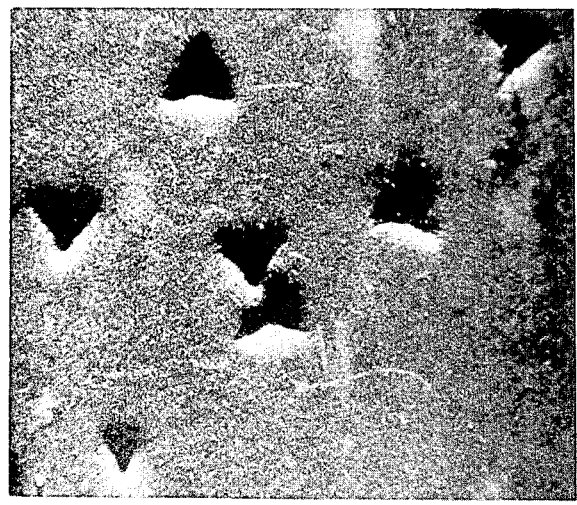
FIG 29

METHOD OF MAKING LEATHERLIKE MATERIALS (B)

This application is related to Civardi application Ser. No. 834,857, filed Sept. 19, 1977, now abandoned, whose entire disclosure is incorporated herein by reference. It is also a continuation-in-part of application Ser. No. 891,834, filed Mar. 30, 1978, now abandoned, whose entire disclosure is incorporated herein by reference.

This application is related to applications Ser. Nos. 891,833 and 891,835 both filed Mar. 30, 1978 and now abandoned, whose entire disclosures have been incorporated, by reference thereto, in said application Ser. No. 891,834.

This invention relates to the production of leatherlike materials.

The leathers used for shoe uppers (and other leather products) come in a great variety of types, grades, and finishes, to meet customer demand. They may vary in color (and in shadings) gloss, softness, grain, thickness, etc. Demand for any particular grade or finish may vary, unpredictably, with changes in the public taste or other circumstances.

Economical manufacture of synthetic leatherlike materials often requires relatively large scale continuous runs of any particular grade or finish. If even a small portion of the demand for variety is to be met promptly, large inventories of a great many different finished materials are needed.

The present application describes an overall system, and various aspects thereof, by which synthetic leatherlike materials of high quality (such as desirable softness, tear-resistance, grain, leatherlike "break", good behavior on lasting of shoes, stitch-retention, pleasing and abrasion-resisting surface, freedom from "orange peel", good moisture vapor transmission, etc.) can be produced as needed. The system even makes it possible for the shoe manufacturer to make his shoe upper materials as required with a minimum of investment in inventory of raw materials and with simple, relatively inexpensive equipment, without the need to use polluting solvents and without the attendant fire and toxicity hazards.

The synthetic leatherlike materials described herein are made up of two or three basic components. One is a thin microporous elastomeric layer. Another is a fibrous backing layer. And a third is a very thin preformed skin. Webs of these materials are laminated together in continuous fashion, preferably entirely by heat, as needed. The microporous elastomeric material and the fibrous backing may be stocked in only one or two or three basic colors (e.g. white, black or grey and brown) and may be produced by large scale continuous manufacture. A wide variety of different colors and patterns of the thin skins may be prepared at low cost, as by gravure printing on suitable thin, economical carrier layers. The grain is produced by continuous heat-embossing of the laminate and may be accomplished on the very same rolls that are used for the laminating.

One way to vary the properties of the shoe upper materials is to vary the fibrous layer. Thus for shoes which are to be made by the known string-lasting or slip-lasting technique, in which the property of stretchability of the shoe upper material (e.g. stretchability such that the upper conforms smoothly to the last at zones of relatively high curvature such as the toe zone) is unimportant or undesirable, the fibrous layer may include a woven structure, such as an open woven scrim, which has (owing to its openness) little yarn crimp and thus resists elongation; the resulting structure is strong but may have a relatively low elongation at break (e.g. an elongation of about 20% or less). Similarly athletic shoes (designed to have high dimensional stability, so as to support the foot well) may be made with such a scrim-containing fibrous layer. For conventional men's dress shoes, particularly of the currently popular softer type, a fibrous layer having considerably greater stretchability may be used (e.g. to produce a structure having an elongation at break of well above 15% such as 25, 30 or 50%). Also, a different fibrous layer may be preferred in order to obtain the thickness desired for a particular use. e.g., different thicknesses may be employed for men's dress and casual shoes, and thinner material may be used for women's shoes. The system described herein permits a change in the type of fibrous layer to be made simply and easily; there is no need to provide an inventory of laminates of any given fibrous backing.

Various aspects of the system are described more fully in the following Examples and discussion and accompanying drawings, in which FIGS. 1–3, 7–9, 12–16B, 18–23A, 33 and 34 are photomicrographs taken with a scanning electron microscope and FIGS. 4, 15, 16 and 25–32 are photomicrographs taken with a light microscope. The scale for each photomicrograph is given in the drawings.

FIG. 5 shows, schematically, a laminating apparatus, FIG. 6 shows, schematically, another laminating apparatus, FIGS. 7 and 8 show a pattern of projections on the microporous material, FIG. 7 being a cross-section.

FIG. 9 is a cross-section showing the bond between fibers and microporous material, formed in Example 2, FIG. 10 shows, schematically, am embossing arrangement, FIGS. 11 and 11A show, schematically, a portion of the embossing apparatus and the path of the embossed material, FIGS. 12 and 12A show the embossed material and FIGS. 13 and 13A show the material before embossing.

FIG. 14 is a cross-section taken at and near the embossed top surface shown in FIGS. 12 and 12A, FIGS. 15, 15A and 15B show the pattern of a first skin-forming coat on a carrier film.

FIGS. 16, 16A and 16B show material having two skin-forming coats on a carrier film, FIG. 17 shows, schematically, apparatus for applying the skin to the laminate, FIGS. 18, 18A and 18B are cross-sections of the product of Example 4, FIGS. 19 and 19A are schematic view of machines for use in the system described herein.

FIGS. 20 to 20C and 21 to 21C are cross-sections of products of Example 7 and FIGS. 22–23A are views of the top surfaces of those products.

FIG. 24 is a schematic view of the embossing procedure.

FIGS. 26, 26A, 27 and 27A are cross-sectional views of a laminate made from the needle-punched materials while

FIGS. 29 to 32 relate to needle-punched microporous material (the darker portions shown in FIGS. 30 and 32 having been inked for contrast).

FIGS. 33 (a cross-section) and 34 (a top view of the embossed surface) illustrate less desirable embossed structures.

FIG. 35 is a schematic view of another laminating arrangement.

In the following Examples all proportions are by weight unless otherwise indicated.

EXAMPLE 1

Figure 1:
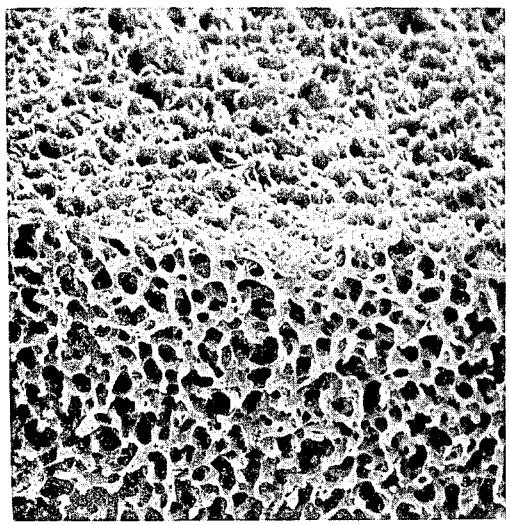
FIGS. 1 and 2 show the microporous material.
Figure 2:
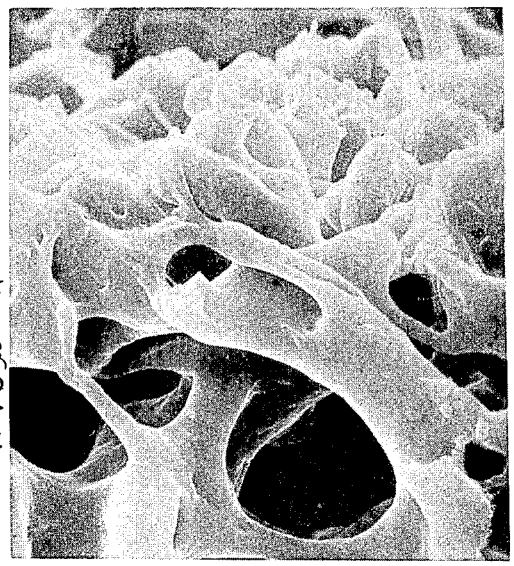

In this Example a fibrous backing is laminated to a microporous polyurethane sheet about 30 mils (¾ mm) thick having a specific gravity of about 0.33 and having the microporous structure shown in FIGS. 1 and 2. These SEM photomicrographs (taken at an edge 11 of a cross-section cut with a razor) show the internal texture (cross section 12) of the microporous sheet and, at a long angle, the similar external texture of its top surface 13. The microporous sheet is made by mechanically slitting a thicker microporous polyurethane sheet made by coagulating, leaching and drying a cast layer containing dissolved polyurethane and dispersed salt particles (salt:polyurethane ratio about 3:1) as described for instance in British Pat. No. 1,122,804, and U.S. Pat. Nos. 3,860,680, 4,028,451 and patents referred to therein. The dissolved polyurethane used in that process also contains about 2 to 5% (based on the weight of polyurethane) of carbon black and the coagulated dried material therefore has a dull black or brownish-black appearance. The dried sheet, 1.6 mm thick, is slit mechanically to form two thinner sheets of about ¾ mm thickness.

The fibrous backing is a 30 mil (about 0.7–0.8 mm) thick fibrous, largely nonwoven, fabric weighing about 7.6 ounces per square yard, made by needle punching polyester (polyethylene terephthalate) staple fibers through a woven scrim and then impregnating with a latex to add about 20% of butadiene-acrylonitrile copolymer rubber as a binder for the fibrous structure. The woven scrim is made of polyester yarns square woven to have about 20 ends per inch in both warp and weft in a very open weave (the spaces between adjacent yarns being about 5 times the yarn diameter) weighing about 1.6 oz/sq.yd. The fibrous sheet may be made by a needling method as described in U.S. Pat. Nos. 3,206,351, 3,090,100 or 3,090,099. The needled staple fibers constitute about 80% of the total fiber weight. The calculated specific gravity of the fibrous sheet is in the neighborhood of 0.25.

Figure 3:
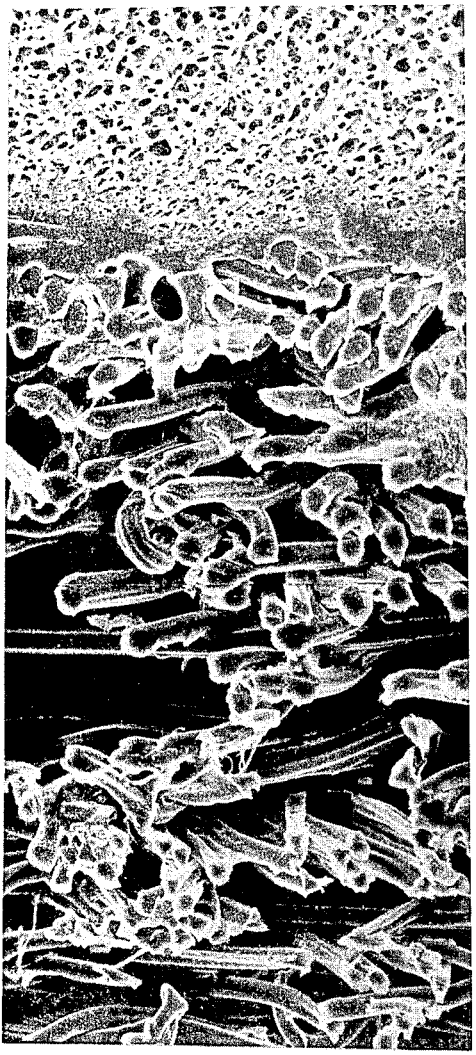
FIG. 3 shows a cross-section of portion of the laminate, illustrating the bonding between fibers and microporous material.
Figure 4:
FIG. 4 shows a macro-apertured web used as a bonding material.

The structure of the resulting laminate, at the interface between fabric and microporous material, is as shown in FIG. 3. The materials are bonded together by thermal fusion, under controlled conditions, of an intervening web of macroapertured elastomeric polyurethane whose structure is illustrated in FIG. 4; it will be seen that it has a lace-like random-patterned fibrous appearance. It is produced by a process of melt-extruding, in tubular form, the polyurethane saturated with inert gas; the extruded material, containing spaced bubbles (formed by release of gas on extrusion), is then stretched to burst the bubbles and opposing walls of the tube are pressed together (while hot and self-adhesive) to form the tubular structure into a flat sheet. Similar materials produced in the same general way (but not having the same melting point and fiber spacing and thickness) are sold under the name "Sharnet", as heat-sealable adhesives for thermally bonding fibrous fabrics together. See U.S. 4062915.

The heat-lamination is effected with the apparatus illustrated in FIG. 5, using an 8½ inch diameter steel idler roll 11 internally heated with hot oil and a 10 inch diameter driven rubber backup roll 12 (whose rubber surface has a Shore A hardness of about 80). The hot roll 11 is mounted for free rotation on an adjustable support 13 which can be raised or lowered to open or close the nip between hot roll 11 and backup roll 12 to the desired degree.

The macro-apertured web W wound on a supply roll 14 is drawn off that roll and over an idler roll 16 and onto the microporous sheet M carried by a roll 17 while the microporous sheet M is drawn off from its supply roll 18, onto a five inch diameter slotted expander idler roll 19 (which functions to avoid creasing or wrinkling), then over an idler roll 21 and the 4½ inch diameter idler roll 17 and then onto the fibrous fabric F which is supported on that heated roll 13. At the same time the fibrous fabric is unwound from its supply roll 22, passed over idler roll 23 and onto the hot roll 11 which has a surface speed of about 2.3 feet per minute; it is in contact with the hot roll for about ⅛ turn of that roll to preheat the fabric, before it is contacted by web W and microporous material M. The resulting assembly of microporous material and fabric is thereafter on the hot roll for about 2/5 turn of that roll. It then travels over cooling rolls 24, 26 to a windup roll 27.

The hot roll has a surface temperature of 340°–350° F. (170°–177° C.). The pressure at the nip is on the order of about 30 to 40 pounds per lineal inch (about 5 to 7 kg/cm) and is such that the effective width of the nip (owing to yielding of the rubber of backup roll 12) is about ¾ inch (about 2 cm). The tension (exerted by the pulling effect of the backup roll) is such that the macro-apertured web W stretches up to about 10% (measured by marking a fixed length of the supplies of web W and sheet M and then measuring the distances between these marks in the laminate).

The melting-sticking point of the macro-apertured web is less than the melting-sticking point of the microporous structure (e.g. ~ 120° vs. ~ 160° C. It is also well below the melting temperature of the polyester (polyethylene terephthalate) fibers of the fabric (> 250° C.).

In the process the macro-apertured web W is heated, on hot roll 11 by heat transferred from and through the preheated fabric F, while the web W is held in place on the fabric and maintained in its substantially continuous lace-like configuration by the microporous sheet. If the web W (which, as previously noted is made by a stretching process) is laid onto the preheated fabric as described, while unrestrained by the microporous sheet and while under the tension resulting from the pulling of the structure by the action of the nip (and the frictional contact with the fabric F) its fibrous structure or network tends to break up into individual spaced lumps even when its temperature is still well below its melting temperature and well below the temperature at which it forms a substantial bond to the fabric. But when it is in contact with the microporous sheet at this stage, the network does not break up but instead adheres to, and forms a bond with, the microporous sheet. Then on further heating and passage through the nip between rolls 11 and 12 under high pressure the heat-tackified network materials is deformed around fibers of the fabric (as can be seen in FIG. 3 see also FIGS. 9 and 18B). The resulting hot laminate is cooled while avoiding small-radius changes in direction (which could exert delaminating forces before the bond between the fibers and the polymer has been set by cooling).

In this Example the web W comes into contact with the microporous material when the web temperature is still below the above-mentioned network-breakup temperature of the web. At some stage in the process the web temperature is sufficiently high to cause the polyurethane of the macroapertured web to form a physicochemical bond with the polyurethane of the microporous structure. Thus, at that state the microporous sheet carries, in effect, integral projections of lower-melting polyurethane in a web, or networks pattern on its surface. When the temperature is then raised above the melting point of this lower-melting polyurethane, the network does not break up into lumps but flows plastically to embed therein fibers of the fabric. The maximum temperature attained at the surface (of the microporous material) being laminated (which temperature may be measured by inserting a piece of temperature-indicating paper on said surface so that the paper is carried through the laminating process) is above the melting point of the polyurethane of the macro-apertured web but well below the melting point of the microporous polyurethane at said surface. It is also below the temperature at which the microporous structure collapses, even under the high pressure in the nip (i.e. below the "collapse temperature" measured at the nip pressure).

The macro-apertured web used in this Example has a thickness of over 3 mils (i.e., over about 0.08 mm) and less than 5 mils (about 0.13 mm), such as about 3.5–4 mils and has a unit weight of over 0.5 oz/yd$^2$ (17 g/m$^2$) and less than 0.8 oz/yd$^2$ (27 g/m$^2$) such as about 0.55 to 0.65 oz/yd$^2$ (about 18 to 22 g/m$^2$). This provides sufficient material, in sufficient local concentration, to effect strong embedment of the fibers. The web has substantially no apertures which are more than 10 mm across (preferably substantially none are above 7 mm across) in any direction. This helps to give a laminate that is not subject to local internal separation or gapping (between bond lines or zones). While there is noticeable anisotropy in the macro-apertured web (in which, it having been formed by stretching, most of the apertures are longer in the "machine" direction, lengthwise of the web, than in the cross direction, as can be seenin FIG. 4), it is nevertheless found that the resulting bond has substantially equal strength in the machine direction and the cross direction. However, undue further stretching in the machine direction (e.g. by more than 10%) does cause some significant anisotropy, which is undesirable for many purposes. Tension control may be effected by various techniques as by control of let-off brackets acting on the supply roll for the web W.

EXAMPLE 2

In this Example the apparatus of FIG. 6 is employed. The materials used are the same as in Example 1, except as noted. The fabric F passes from its supply roll around one or more idler rolls 31 and then around a series of preheating rolls 32 which are internally heated, with hot oil, at a temperature of 325° F.; as will be seen from the drawing, they apply heat alternately to the two faces of the fabric. At the last hot roll 32A of this series the pre-heated fabric is brought into contact with an assembly of the macro-apertured web W and the microporous sheet M, then the three-layer assemblage passes around a roll 33 and then a heater roll 34 which contacts the fabric F of the assemblage and is at a temperature higher than that of the pre-heating rolls, and then over an idler roll and onto a final heating roll 36 internally heated with steam at a temperature of 350° F. and then through the nip between that roll 36 and a rubber-covered back up roll 37 (the force at the nip being 60 pounds per lineal inch) then around cooling cans 38 and idler rolls 39 to a windup roll.

The webs W and M are passed from their respective supply rolls 41, 42 to an idler roll and then (if required by the available equipment) over other idler rolls 43, 44 to the pre-heating roll 32A.

In one run the temperature of heater roll 34 is about 360° F. (182° C.) and the speed is such that the time of contact with that roll is about 0.1 minute, the temperature of the heater roll 36 is about 325°–350° F. and the time of contact therewith is about 0.2 minute.

All the webs are pulled over the various rolls by the forced exerted, at the nip, by the driven backup roll 37, which also causes the hot roll 36 to rotate. The rolls 32, 32A, 33, 34 may be independently driven at surface speeds slightly less (e.g. 1% less) than that of backup roll 37 to insure that the fabric F makes a tight wrap around those rolls thus facilitating heat transfer to the fabric. The tensions in the fabric F and webs W and M are controlled by appropriate adjustment of brakes on the supply rolls. The tender web W is under tension which tends to stretch it lengthwise and cause it to decrease in width; preferably this tension is so controlled (as by the braking) that the resulting lengthwise stretch is less than 10% and the consequent decrease in the width of web W is well below 15% (e.g. from a starting width of 44 inches, the web necks down to a width of no less than 39 or 40 inches). The microporous sheet M is also maintained under tension, preferably at a level such that it stretches less than 5% (e.g. 2½–3%) in its passage to the nip.

The particular sheet of microporous material used in this Example 2 has small spaced projections on the face which comes into contact with the web W and fabric F. It is a 30 mil (¾ mm) thick sheet made by mechanically splitting (in half) a 1.6 mm thick white-pigmented coagulated, leached and dried microporous polyurethane sheet made by a casting process (described in U.S. Pat. No. 3,860,686) in which such spaced projections are, incidentally, formed on the lower face of the sheet. (FIGS. 6 to 8 of U.S. Pat. No. 3,860,686 illustrate the pattern of projections formed on one type of casting belt.) FIGS. 7 and 8 of the present application show a pattern of projections which is essentially like that of the material used in this Example (those FIGS. 7 and 8 are actually views of another microporous layer which differs from the layer used in this Example, in density and melting point). In FIG. 7 the spaces 51 are formed by the parallel warp wires of a square woven wire casting belt on which the product is formed, while the arc 52 is a depression formed by a weft wire, which runs transverse to the warp wires of the belt and is interlaced with these warp wires, in a plain ("one up and one down") weave. The diameters of the wires are about 17 mils (warp), 8 mils weft and there are about 36 warp wires per inch and about 68 weft wires per inch). Thus, behind the plane of FIG. 7 there is another arcuate depression (53 shown in FIG. 8) of the same shape as the depression 52 but not in staggered relation thereto.

FIG. 9 indicates that the bond between the microporous material and the fibrous fabric is largely localized at the outer portions of the previously mentioned small spaced projections. Nevertheless it is a very strong bond.

EXAMPLE 3

The laminate of Example 2 is passed around an idler roll 54 (FIG. 10) and then around a driven roll 56 and around a driven heating roll 57, then over a roll 58, to the nip between a heated embossing idler roll 59 and a rubber-surfaced backup roll 61 which is pressed against the embossing roll, and then, over cooling rolls 62 to a driven takeup roll 63. The surfaces of rolls 57 and 59 are at about the melting-sticking temperature (discussed below) of the microporous polyurethane. The exact temperatures of the roll surfaces are not known and the temperatures given here are rough approximations. Roll 57 is internally heated with oil (at about 350° F.); roll 59 is internally heated with steam (at about 345° F.). The backup roll 61 is driven at a surface speed about 1% higher than that of the rolls 56, 57 so that the material is pulled and therefore pressed closely to the surface of the latter rolls. On the heating roll 57 the residence time (of contact between the surface of the microporous polyurethane material of the laminate and the hot roll surface) is about 6 seconds; the laminate is under lengthwise tension but this does not cause significant thinning or compression (in thickness) of the microporous material. At the nip, the laminate is compressed considerably against the hot surface of the embossing roll which is also at a temperature close to the sticking temperature. This embossing roll has a pattern of surface ridges conforming to the surface grooves or veins in grain leather, and the localized pressure exerted on the microporous material by these ridges is sufficient at this temperature to cause the microporous material to tend to adhere to the surface of the embossing roll after it leaves the nip; thus when the speed of the takeup roll 63 is adjusted so that there is practically no tension on the laminate leaving the nip, the laminate (see also FIG. 11) stays on the surface of the rotating embossing roll 59 for a short distance. The microporous surface becomes embossed, in that it has a distant grain pattern of grooves or lines like that of grain leather but no continuous skin is formed on the microporous surface. In fact, even after the embossed material has been given a color coating (i.e. two white pigmented coatings of elastomeric polyurethane each applied, by gravure printing from a gravure roll whose surface has conventional tiny coating-containing cups or hollows uniformly distributed therefore, the amount of each coating applied being 2.5 grams of polyurethane per square meter), the surface of the embossed is still devoid of any continuous skin. See FIGS. 12 and 12A which are top views of the embossed and coated material and compare them with FIGS. 13 and 13A which are similar views of the untreated surface. It will be noted in FIG. 12 that there are some areas in which localized compaction appears to have occurred to a larger degree but without significant destruction of the essential open pore structure.

During the treatment described in this Example the entire microporous layer is exposed to heat. At its outer surface the temperature is at about its melting-sticking temperature. At the fabric-bonded face the temperature is below the softening temperature of the lower-melting, polyurethane of the web W. After leaving the nip the microporous polyurethane is not subjected to any significant tension while hot, but is permitted to relax. It is believed that this effects an annealing of any stresses and strains such as those imposed by pulling of the material lengthwise during manufacture or processing (e.g. during the laminating step), and that such annealing helps to impart to the material a softer, leather-like hand, rather than a "plastic" feel. It is noted that at times the laminate will have a tendency to curl, with the microporous polyurethane being on the concave side (particularly when the microporous polyurethane web M has been pulled more than desired during the laminating step) and that such curl is significantly reduced or eliminated by the effects of the embossing.

The product of Example 3 has outstanding utility for uppers of sport shoes (such as tennis shoes) made by a process involving conventional injection molding of the sole of the shoe to the insole and the upper. In that process the sole is formed in a cavity whose upper wall includes the lower portions of the upper; the sole-forming material (which, in reaction injection molding, may be a reactive polyurethane) is injected into the cavity, displacing the air in the cavity. To expedite the process the upper material must be highly permeable to the displaced air, especially when low injection pressures are employed. The highly open surface shown in FIGS. 12, 12A and 14 permits rapid air transmission at a pressure difference of say 100 mm of water (such as permeability of 50,000 liters of air per square meter per hour at 20° C.); in contrast, the same material subjected to more drastic embossing (FIGS. 30 and 31) has much lower air permeability. Typical products of Example 3 (having a unit weight of 14.7 oz/sq yd, thickness of 0.062 inch, specific gravity 0.32, ultimate elongation of over 100% in all directions) have high tear strength, high water vapor permeability, outstanding abrasion resistance and resistance to flexing and excellent washability.

As mentioned above, the material may be color coated, as by gravure printing, after embossing. One such coating is an off-white (or grey) made up of 215 parts of Verona Impranil D392 (described below), 480 parts of Permuthane U-23-336 (also described below) 61 parts of a white color concentrate (Verona White PP901) and very small amounts of red, black and blue color conentrates, plus 223 parts of a 1/1 toluene/isopropanol blend.

EXAMPLE 4

A sheet of Mylar (polyethylene terephthalate) film about 1 mil (25 microns) in thickness and having a shiny surface is drawn off from a roll thereof and printed, by direct gravure printing in a "spray" ground pattern, with a black-pigmented solution of thermoplastic elastomeric polyurethane of relatively high modules in a volatile solvent. The printed sheet is heated to remove the solvent, leaving a dry non-tacky mottled gray deposit having a thickness of less than 0.2 mil (less than 5 microns). This deposit is transparent; thus when the coated sheet is laid onto a newspaper it is easy to read the printed words of the newspaper through the printed sheet, as illustrated in the enlarged photograph FIG. 15. FIG. 15 also shows the "spray" pattern which gives the same overall mottled effect as a light non-uniform spray. FIGS. 15A and 15B are views of this first coating at different, much higher, magnifications.

The sheet is then given a second gravure coating on top of the first one, this time with a burgundy pigmented solution of thermoplastic elastomeric polyurethane which is softer (of lower modulus) and has a lower melting point than the previously applied polyurethane; the coated sheet is then heated to remove the solvent. The amount of this second coat is such that the total coating thickness (both coats) is less than 0.3 mil (less than 8 microns). The twice-coated sheet is still transparent and non-uniform by transmitted light (see FIG. 16), but less so than the once-coated sheet. (The dot patterns seen in FIGS. 15 and 16 correspond to the pattern of the tiny coating-carrying "cells" of the gravure roll.) When viewed against a white background it appears pink with darker pink mottling. FIGS. 16A and 16B are viewed of the resulting coating at different, much higher, magnifications. The coated sheet is rolled up for storage.

Both coatings are found to be tightly bonded to the Mylar film; they are not visibly affected by scraping with one's finger nail.

The coated sheet is then used for applying a thin skin to the top (microporous) surface of the laminate of Example 1.

In the skin-applying step the apparatus shown in FIG. 17 is employed. In this apparatus the coated side of the Mylar film is brought into contact with the surface of the microporous layer and heat is transferred through the film to the coating and microporous surface while pressure is exerted on the assemblage. The lowermelting second coating fuses sufficiently to bond the coatings to the microporous surface. More particularly the apparatus includes an 8½ inch diameter steel idler roll 11, internally heated with hot oil, and the coated film S and microporous-surfaced fibrous laminate L are pulled onto this hot roll by the force exerted (on the assemblage of S and L by a 10 inch diameter driven rubber backup roll 12 (whose rubber surface has a Shore A hardness of about 80) which is in contact with the fibrous bottom surface of L. The hot roll 11 is mounted for free rotation on a conventional adjustable support 13 (which can be raised or lowered to open or close the nip between hot roll 11 and backup roll 12 to the desired degree) the support 13 being adjustably forced under pressure in a direction to urge the hot roll 11 against the backup roll. More particularly, the coated film (wound on roll 71) is drawn off over idler rolls 72, 73, then over a five inch diameter slotted expander idler roll 74 (which functions to avoid creasing or wrinkling), and then onto laminate L which is supported on the backup roll 12. At the same time the laminate L is unwound from its supply roll 76, passed over idler roll 77 and onto the backup roll 12. The resulting assembly of S and L is on the hot roll for about 3 to 5 seconds. It then travels over idler (cooling) rolls 78, 79, to a windup roll 81.

Roll 11 has a surface temperature which is believed to be on the order of about 345° F. The pressure at the nip is on the order of about 10 pounds per lineal inch and is such that the effective width of the nip (owing to yielding of the rubber of backup roll 12) is about ½ inch. Thereafter the Mylar film is stripped off (this requires substantially no force). Even though the hot roll 11 is an embossing roll, having a leather-grained dull outer surface, the product has a shiny surface (with a very light grain embossed therein) and the Mylar film still is very smooth to the touch and has a clear appearance (although it shows a faint grain pattern of fine creases). The material is given a marked leather grain appearance and feel by passing it through the nip between the rolls 11 and 12 and then over roll 11 in the manner shown in FIG. 17 while the hot embossing roll 11 is maintained at a surface temperature believed to be on the order of about 345°–360° C.

The product has a relatively dull, or "flat", leather-grained surface with a subdued aniline appearance. Its color is rich reddish brown and is much deeper and darker than that of the skin, because, it is believed, the dark surface of the original microporous surface shows through the skin, changing the pink color of the skin to a deep reddish brown color.

The structure of the skin and underlying microporous material is shown in FIGS. 18 and 18A.

The first coating on the Mylar sheet has the following composition: "Impranil D 392" 277.3 parts; "Permuthane U-23-336" 641 parts, "Impranil PP-922 Jet Black" 81.7 parts. The Impranil D 392 is a solution of a light-stable elastomeric polyurethane sold by Verona Dyestuff Division of Mobay Chemical Corp.; it contains 30% polymer and 70% solvent (dimethylformamide/toluene/isopropyl alcohol in 1/2/1.5 ratio); this solution is then diluted with a sufficient amount of a 1/1 toluene/isopropanol blend to reduce its viscosity to a suitable level (e.g. to a viscosity of 15 poise) for gravure printing. The Permuthane U-23-336 is a 14% solution of an aliphatic elastomeric polyurethane in a mixture of methyl cellosolve, toluene and isopropyl alcohol. The Impranil PP-922 Jet Black (also sold by Verona) is a pigment concentrate containing 7% pigment and 22.0% total solids the 14% difference being dissolved cellulose acetate butyrate ("C.A.B."). The Impranil D392 comprises a very hard clear polyurethane and, if used alone, gives a very glossy coating, while the Permuthane U-23-336 contains a conventional flatting or dulling agent and also has a lower viscosity. By using a mixture of these, as described, the final product has a medium gloss, good face-to-face slip, good hand and good flexing, good blocking resistance and good release from the hot embossing roll. As can be seen from FIG. 15 the deposit of the first coating is not uniform; the average amount of solids deposited is in the range of about 2 to 3 (e.g 2.5) g/m². The solvent removal after printing is effected in an over at about 70° C. for 2 minutes.

The second coating on the Mylar sheet has the following composition: "Witco Y 343" 504.3 parts, red-blue pigment concentrate 214.3 parts, 1/1 toluene/isopropanol mixture 281.4 parts. The Witco Y 343 is a 35% solution of a non-discoloring thermoplastic elastomeric polyester polyurethane in a 15/35/25/25 blend of toluene/isopropanol/DMF/methyl cellosolve. The pigment concentrate contains 9.3% pigment and 10.86% of a mixture of C.A.B, and the elastomer of Witco Y343; The average amount of solids deposited in the second coating is in the range of about 2 to 3 (e.g. 2.5) g/m². The solvent removal after printing is effected in an oven at about 70° C. for about 2 minutes.

In the coatings the polymers are most preferably of the well known "nondiscoloring type, resistant to discoloration by ultraviolet light. Such materials are well known in the art and are commercially available.

EXAMPLE 5

Example 1 is repeated except that the Mylar film has a thickness of about 0.4 mil (about 10 microns) and the skin applying and final embossing are effected in a single step, using the same dull grained surface embossing roll as described in Example 1 operating under the similar embossing conditions but with the embossing roll in contact with the Mylar film. The product is similar to that of Example 1 but has a much more lustrous surface and a shallower grain.

EXAMPLE 6

Example 5 is repeated, except that the Mylar film is a commercial film having a dull surface to produce a grainedsurface product having a subdued luster.

EXAMPLE 7

Figure 20:
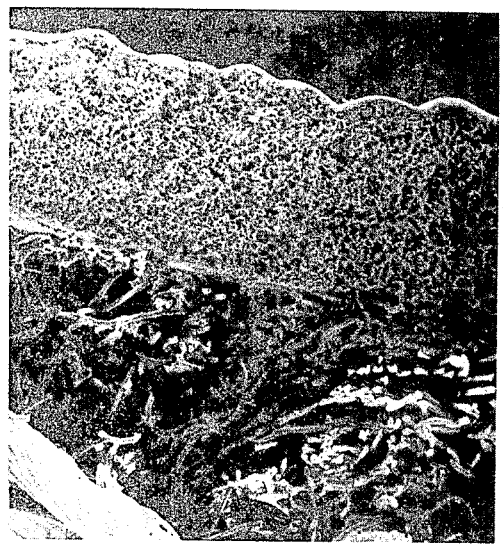
Figure 20A:
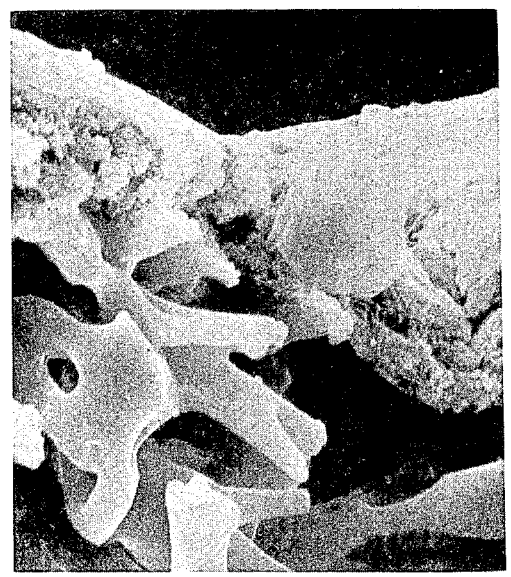
Figure 21:
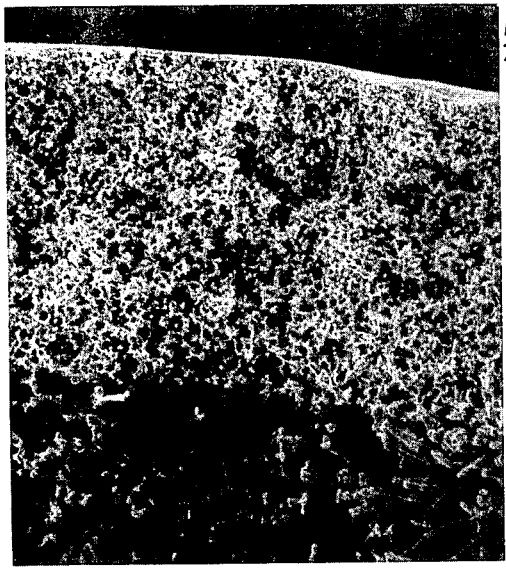
Figure 21A:
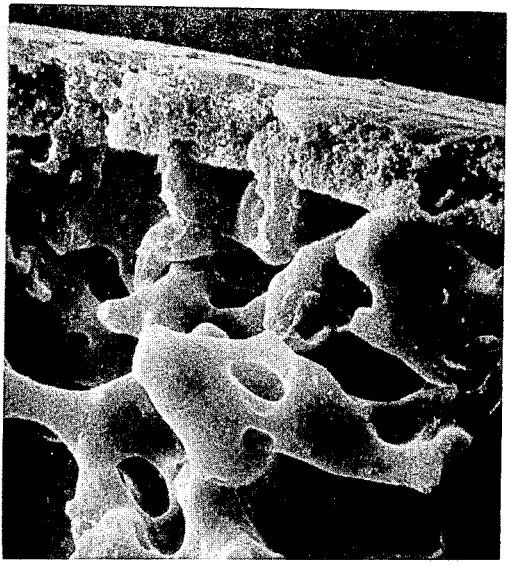
Figure 21B:
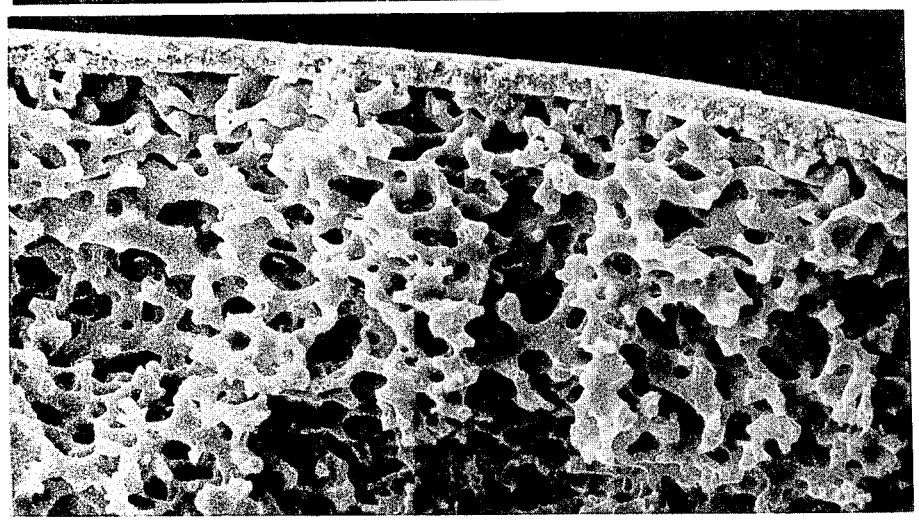
Figure 21C:
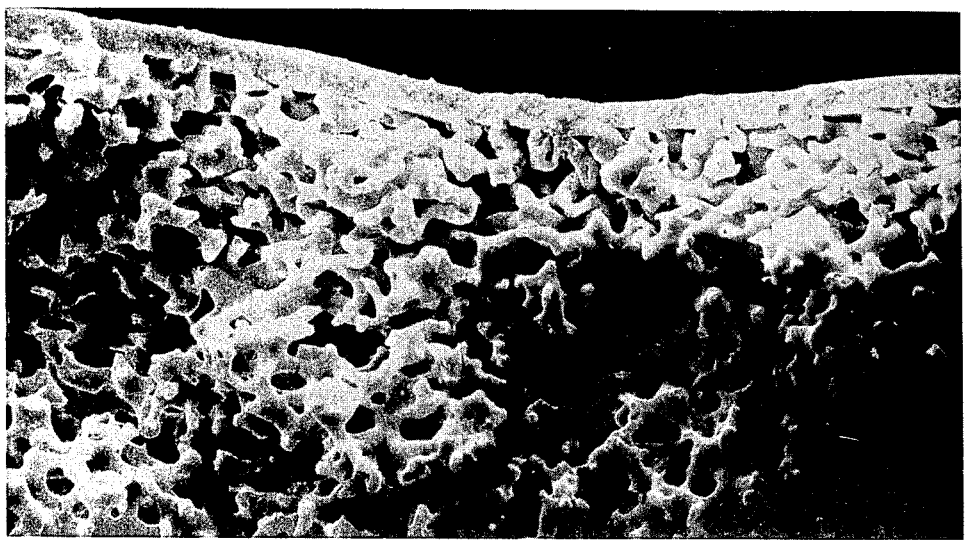

In this example a film of Mylar about 0.5 mil thick is coated with two thin polymeric layers: (a) the layer first deposited on the Mylar film (which is to form the outer skin surface of the artificial leather) is of a hard relatively inflexible polymer, such as polymeric methyl methacrylate (b) the second layer (which is to serve as the thermoplastic adhesive which bonds the first layer to the microporous surface), is of a flexible polymer, preferably an elastomeric polyurethane such as a polyester polyurethane made from ethylene glycol (or other glycol) adipate polyester and hexamethylenediisocyanate. To promote release of the Mylar on heating the Mylar may first be coated with a very thin layer of a release agent such as a hydrocarbon wax (e.g. a paraffin wax or microcrystalline wax). The two skin-forming layers may each be applied to the Mylar film as solutions in solvents, which are then evaporated off as in Example 4. The total thickness of the two layers is about 3½ mil or about 13 microns as will be seen in FIGS. 20A and 21A, while the thickness of the harder layer (a, above) is less than 5 microns such as about 1 to 2 microns.

The coatings on the Mylar are transferred to the microporous surface of a laminate like that described in Example 2 in a manner such as that described in Example 4; in this case the nip pressure is very low so as to avoid permanent compaction of the microporous layer while the roll temperatures and roll contact time, are sufficiently high to effect activate the adhesive qualities of the skin and thus bond the skin to the microporous layer. The Mylar film can be stripped off while the material is still hot, or stripped off later. Preferably it is stripped off hot, as shown in FIG. 19; the still-hot skin and upper zone of the microporous layer may then be embossed with a minimum of reheating.

In the embossing step employed in this particular Example the laminate carrying the skin is passed into the nip between the previously described hot grain-surface embossing roll 11 and backup roll 12 (with its skin in contact with hot roll 11) and remains stuck to roll 11 (whose surface temperature is probably in the neighborhood of 360° F. for a period of some 5 seconds before it is drawn off. Two different draw-off systems are employed:

(A) In one, like that shown schematically in FIG. 11, the material being drawn off forms a loop with the hot microporous layer on the convex side, and the material is drawn off from that loop at a rate carefully controlled to maintain the running material in that loop form (just as it leaves the hot roll) under substantially no tension.

(B) In the second system, shown schematically in FIG. 11A the material is drawn off under tension and the loop is maintained by the presence of a guide bar 91.

In both cases the resulting material had a well-formed leather grain appearance. FIG. 22 is view taken at 45° of the material made by process A. FIGS. 23 and 23A (at a higher magnification) are similar views of the material made by process B.

Figure 20B:
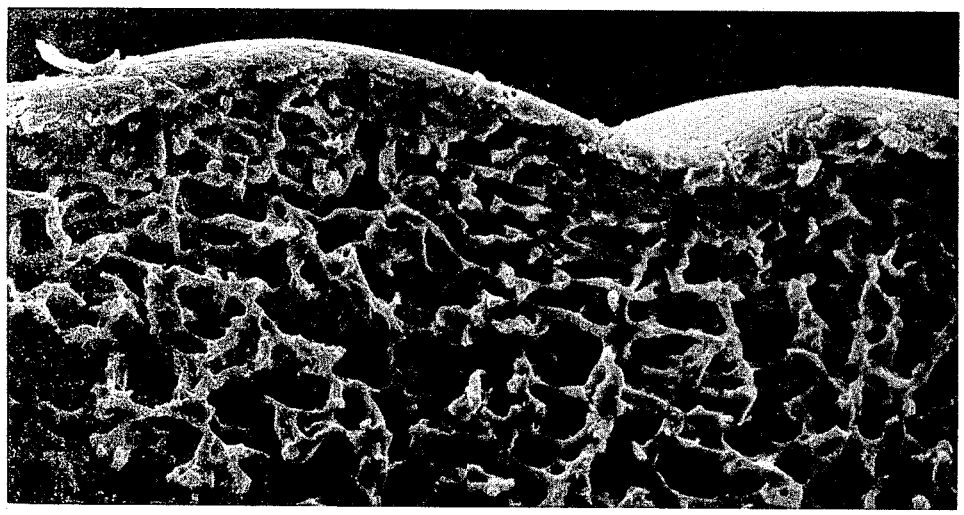
Figure 20C:
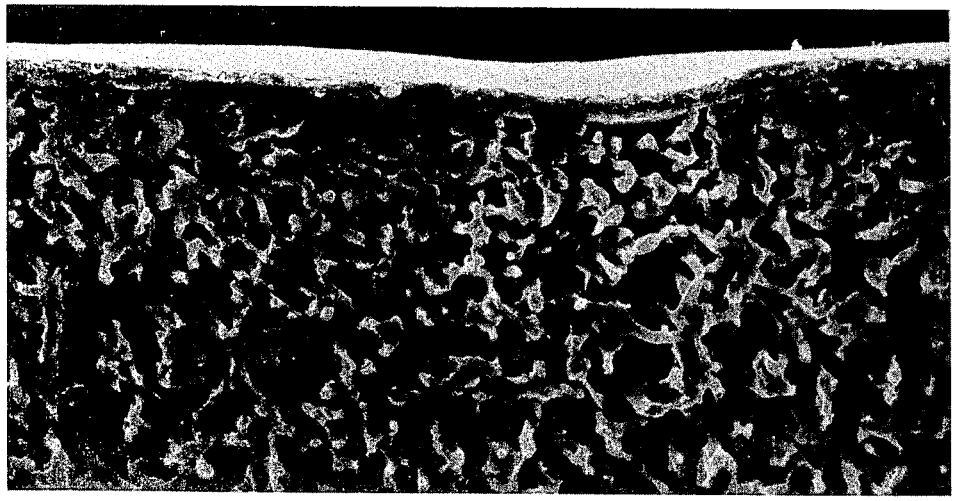

In both cases there is substantially no compaction of the microporous layer. The thickness of the product in each case is about 62 mils before embossing and about 62 mils after embossing and cooling. The structure of the materials made by processes A and B are shown in the cross-sectional views in FIGS. 20 to 20C, (for A) and 21 to 21C (for B).

In both cases it will be seen that the harder outer layer of the skin tends to break into plates, especially on flexing in use, (see FIGS. 20B and 21A for instance); these are held firmly by the elastomeric lower layer.

The material made by process A has a much more pleasant, softer leatherlike hand. Its fibrous layer is not taut but so free of tension that it shows (in this case) slight puckering.

A sample of the material made by process B is retained in curved configuration (in the machine direction as in the loops in FIGS. 11 and 11A) without tension in an oven at 150° C. for 10 min. then taken out hot and allowed to cool under a weight which keeps it flat. The material is found to have a feel and appearance like that of the material made by process A.

It is believed that the embossing effects shown in FIGS. 20 to 20C and 21 to 21C can be explained as follows: The microporous layer has a large void volume, well over 50% (e.g. about 70-75% for a layer having a specific gravity about 0.3), and is composed of thin walls of elastomeric material around its cells or voids (see FIG. 1). It is thus relatively easily compressible; its cellular structure collapses, at least partially, resiliently under pressure. When (as shown schematically in FIG. 24) the laminate having the skin thereon is brought into the nip between the metallic embossing roll 11 (which has embossing ridges 101) and the rubber-surface backup drive roll 12, the microporous layer 102 is squeezed at the nip and the rubber surface 103 of the backup roll is deformed. The pressure at the nip is sufficient under these conditions to force the embossing ridges 101 into the material and to cause the skin to conform closely to the very hot surface of the embossing roll. The temperature of that surface is such that if the material remained compressed in the nip for some time the microporous layer would become permanently compacted. However the rate of travel of the material, and its effective path length in the nip, are such that the time in the nip is very short (e.g. less than 0.1 second, such as 0.03 second) and, despite the fact that the solid skin provides relatively fast heat transfer (as compared to heat transfer at a wholly porous surface), it is found that such permanent compaction can be substantially avoided.

After the material leaves the nip its microporous layer expands to substantially its original thickness; the skin surface remains on the hot surface of the embossing roll for a period of time such that the skin and the immediately underlying portion of the expanded microporous material are molded to the configuration of the very hot surface of the embossing roll. See for instance FIGS. 20-20C. The hot embossing surface may be at a temperature well above the fusion temperature of the skin, and the contact between the hot embossing surface and the skin may be such that the laminate adheres to the embossing surface against the force of gravity as shown in FIG. 29. (The penetration of the hot embossing ridges into the microporous layer and the resulting local plastic deformation of the latter may aid in supporting the laminate on the roll at this stage). For instance, the material may remain in contact with the surface of the hot embossing roll for about ⅓ or ½ of a revolution (120° or 180°) of that roll, for a period of time well over ½ second (e.g. about 1 or 2 to 6 or 10 seconds).

The temperature of the embossing surface is generally within about 15° C. (more preferably within about 10° or 5°) of the melting-sticking temperature of the microporous material. In one embodiment, the temperature of the embossing surface is at or above the melting temperature of the material of the skin (especially the material at the underside of the skin which is in contact with the microporous surface); it is best to have a release agent (such as the hydrocarbon mentioned earlier) at the outer surface of the skin to prevent undue sticking to the embossing surface. When such undue sticking occurs, all or part of the skin may remain on the embossing surface when the laminate is removed therefrom.

In one typical run the surface temperature of the steel embossing roll is about 165° C., the melting-sticking point of the microporous material is about 160°–165° C. the melting-sticking point of the skin material adjacent to the microporous layer is about 160°–170° C. and the melting temperature of the macro-apertured material is about 120° C. With a steel embossing roll having embossing ridges which project out about 10 mils from the base level of the roll surface, a backup roll whose rubber surface layer is about ¾ inch thick and has a hardness of 62 (Shore A durometer), and a laminate which is about 60 mils thick and is compressible to a thickness of about 20 mils, the rolls are adjusted so that the rubber surface of the backup roll is just in contact with the outer edges of the embossing ridges and a stop is positioned to prevent the rolls from approaching any closer than that during operation (and, during operation, a force of about 7 lbs. per lineal inch of nip is applied across the axes of the rolls to bias them toward each other); the use of the stop in this manner effectively avoids undue local rises in pressure.

The conditions of embossing are such that there is a sharp temperature gradient between the embossing surface and the interface between the microporous layer and the fibrous layer, so that the lower-melting material derived from the macroapertured web is kept at a temperature below that at which it becomes mobile; the bond, at that interface, between the fibrous and microporous layers is substantially undisturbed. The use of relatively low pressures at the nip helps to preserve this thermal gradient; at high pressures (with consequent higher compression of the microporous layer), the transfer of heat to that interface is much more rapid.

For any particular set of materials and any particular piece of equipment the temperatures, pressures and times will need to be adjusted, by trial-and-error, to arrive at the optimum operating conditions within the guidelines set forth herein. For instance, the thermal responses of different batches of similar polyurethanes may differ and the temperature level needed for sharp embossing may be some 5° or 10° C. higher for one batch than for another even though they have similar melting-sticking temperatures. Even with the same batch, one may vary the embossing conditions. Thus for a material which embosses best at one temperature level one may, less desirably, use a lower embossing temperature (some 10° or 15° C. lower) with a somewhat higher nip pressure, and consequent greater deformation of the rubber roll at the nip; such use of lower temperature and higher pressure usually gives a product whose grain pattern is not as sharp and whose "break", hand, moisture vapor transmission are not as good.

In Examples 4–7 above, the thin elastomeric skin is deposited onto a smooth strong plastic (Mylar) film of high dimensional stability and modulus and high softening temperature. The skin is applied to the microporous layer and the stable plastic film is stripped off. The step of applying the skin to the microporous layer may be effected under the very same conditions (e.g. pressure, temperature and time) as the subsequent embossing step, previously discussed. The hot roll may have the very same embossing surface, but (owing to the presence of the stable plastic carrier film) even then very little embossing of the material occurs at this stage (and the stripped polyethylene terephthalate carrier film remains shiny, flat and smooth to the touch, but may have a faintly visible embossed pattern of fine shallow creases). The support may also be a relatively weak, stretchy film of low softening temperature such as low density polyethylene film, especially if the skin-film composite is handled carefully (as under controlled relatively low feeding tensions to avoid undue stretching) and the hot roll in contact with such film 30 has a non-adherent (e.g. Teflon) surface. Another suitable support is a film of stereoregular polyolefin such as polypropylene, e.g. biaxially stretched or extruded (cast) polypropylene film.

The skin in Examples 4–7, above, is quite thin (well below 20 microns) being below 15 microns in Example 7 and below 10 microns in Example 4.

The skin may also be stripped from its carrier film (or other carrier structure, e.g. paper) before the skin is applied to the surface of the microporous material and the desired steps of applying the skin and embossing may then be combined, using a single pass around the hot roll under the same conditions as described above. Since the unsupported skin is elastomeric, tender and stretchy, greater care is required for such an operation, such as finer control of feeding tensions. In such embodiment the carrier film may be stripped away and the unsupported skin may be rolled up for storage and then unrolled when it is to be applied; alternatively the apparatus may have provision for stripping off the carrier film during the travel of the carrier skin composite from a supply roll to the hot embossing roll, e.g. the carrier film may be stripped off just before the skin comes into contact with that hot roll.

The same kind of process may occur in the absence of a skin, as in the process of Example 3. Comparison of FIGS. 1, 2, 13 and 13A with FIGS. 12, 12A and 14 indicates that fusion and spreading of the individual outer edges of thin polyurethane walls of the cellular structure occurs on contact with the hot embossing surface. Less desirably, substantially complete fusion of the outer surface may occur (as shown in FIGS. 33 and 34) when the contact time in the nip is unduly prolonged at a given temperature.

A typical leather grain pattern has relatively deep, broad and widely spaced intersecting "veins" whose depth is on the order of about 5 to 10 or 15 mils, and shallower "hair cells" which are small depressions having a depth on the order of about ½ to 1 mil, or more. The embossing roll has a corresponding pattern of vein-forming ridges and hair cell-forming knobs of corresponding heights. In FIG. 22 reference numeral 91 indicates a vein and numeral 92 indicates hair cells.

In the foregoing Example 7 the microporous material is dull black and the skin is pigmented a deep opaque black. It will be understood that other color combinations may be used (e.g. a white skin on a white microporous layer). Also either or both layers of the skin may be transparent; they may be either clear or transparently or translucently pigmented (or dyed) in a color, or colors, selected to augment or modify the color of the microporous surface as in Example 4.

The surface of the microporous layer may be preheated, before it passes through the nip; e.g. that surface may be preheated to substantially its melting-sticking temperature and then passed through the nip between the embossing roll and the backup roll and then travel along the hot embossing roll. With such a procedure embossing may be effected at quite a rapid rate. A procedure of this type is described in Example 3 (and FIG. 10) wherein a preheat roll 57 is employed. It has also been found that the carrier web (e.g. the Mylar film employed in Examples 4 to 7 may be stripped off just after the material leaves the hot skin-applying roll, while the material is still hot; the thus preheated skin-carrying laminate may be fed directly to the nip of the embossing roll, as illustrated schematcally in FIG. 19.

In FIG. 19, a supply of a laminate (of microporous layer and fibrous layer) is let off from braked roll 105, passes over tensioning rolls 106 and adjustable idler roll 107 while a supply of plastic film (e.g. Mylar) carrying the skin is let off from braked roll 108 and fed to the hot surface of an oil-heated Teflon-coated roll 109. The laminate passes onto the skin on hot roll 109, the assemblage passes through the nip between backup roll 111 and hot roll 109, then between idler rolls 112, 113 at which point the film is stripped off and wound up (on roll 114) for re-use while the hot skin-carrying laminate passes on to the surface of hot embossing roll 116, then through the nip between that roll 118 and backup roll 117, then over adjustably located idler roll 118, idler roll 119 and roll 121 to windup roll 122 which is driven by roll 123. The arrangement of rolls 121 and 124 serves to isolate the winding tension from the material passing over roll 121.

The same apparatus may be used, with modifications, for the laminating, as illustrated schematically in FIG. 19A, in which the rolled up supply of macro-apertured web is mounted on a roll 131 having a ball-bearing shaft and is fed over a short path (with substantially no tension) directly into contact at idler rolls 132, 133 with the microporous sheet M which is being pulled, under tension from its supply (not shown) over tension rollers 106 and idler roll 107 and the macroapertured web (carried by the microporous material) passes into contact with the heated surface of the fibrous web F which has been drawn under tension over tension rolls (not shown) and idler rolls (not shown) around hot roll 116 and onto the surface of hot roll 109. The whole assemblage, with the fibrous layer in contact with hot roll 109 passes around that hot roll and through the nip between backup roll 111 and that roll 109.

EXAMPLE 8

This Example illustrates that hot-laminating and transfer of skin to the microporous surface may be effected in a single pass over a hot roll and that the heat for the lamination may be transferred through the microporous layer to the fusible adhesive without collapse of the microporous material by suitable control. Referring to FIG. 35 a film of Mylar, carrying skin-forming layers (as described in Example 7 above), is fed from its supply roll 141 over guide rolls 142, 143 to the hot surface of the 8½ inch diameter steel idler embossing roll 11 internally heated with hot oil (e.g. at a temperature in the neighborhood of 345° F.). At the same time the microporous sheet material M (wound on supply roll 144 and fed around idler guide roll 146), the macro-apertured web W (wound on supply roll 147) and the fibrous backing F (wound on supply roll 148 and fed around idler guide roll 149) are all drawn off their supply rolls to an idler guide roll 151 at whose surface they are assembled together. (The supply roll the macro-apertured web is placed as close as possible to the assembly point to reduce necking down of that web as it passes from roll 147 to roll 151). The assemblage is fed onto the heated skin on the embossing roll so that the microporous surface adheres to the skin as the whole assemblage passes around the embossing roll and through the nip between that roll and 10 inch diameter driven rubber-surfaced backup roll 12, after which the material is drawn off as in Example 1. At a driven roll speed of about 3 feet per minute there is a good grain pattern but the microporous structure is drastically collapsed; when the roll speed is increased to about 5 fpm the microporous layer of the resulting product is not as collapsed but shows little, if any, leatherlike "break". But when the roll speed is increased to about 9 fpm a good leather-like "break" is obtained (with little grain embossing) while retaining good adhesion between the fibrous and microporous layers. The surface is then embossed (e.g. in the manner described in Example 7) to provide the grain pattern.

While the illustrations show the backup roll below the embossing roll, it will be understood that these rolls may be side-to-side or the backup roll may be above the embossing roll.

For best results the surface temperature of the hot rolls (particularly the embossing roll) should be carefully controlled. To this end the internally heated roll should have a relatively thin outer wall (e.g. ¾ inch thick steel) and the heating fluid, such as oil, should be circulated at a relatively rapid rate to maintain a relatively uniform temperature over the entire roll surface; typically the fluid circulates through a cylindrical annular space whose outer boundary is the annular cylindrical outer wall of the roll, and there is a vane (or vanes) to cause the fluid to flow in a spiral path along that wall. The equipment also preferably has suitable devices for maintaining the webs or sheet materials in alignment as they are fed to the zone where they are brought into contact with each other, and devices for trimming off edges (where owing to misalignment, the desired lamination or bonding has not occurred). The hot roll used for laminating may have a non-stick surface (e.g. a surface coated with polytetrafluoroethylene) so that it will not be marred by contact with mis-aligned macro-apertured web material.

As previously mentioned, the embossed material is preferably taken off the embossing roll in a reversely curved path to effect the relaxation previously described. Apparently the contact with the hot roll causes sufficient transfer of heat into the main body of the microporous layer so that its temperature while in the zone Z (FIG. 24) is sufficiently high to effect that relaxation under the circumstances. Very good results have been obtained when the arc formed in zone Z has a relatively small radius (e.g. well below 2 inches such as about ¼ inch or ½ inch) and the time of travel around that arc is relatively short (e.g. as low as 0.03 seconds or less, although of course longer times may be used). The position of the arc may be pre-set, as by positioning a guide bar (e.g. a ½ inch diameter rod) as shown in dotted lines in FIG. 11. The guide bar may be freely rotatable to make sure that the material is not drawn around it under a significant tension.

The preferred microporous materials are produced by coagulating at least one layer of a solution of elastomeric polyurethane in a liquid solvent (e.g. by contacting the layer of solution with a non-solvent or coagulant which is miscible with said solvent); methods of this type are well known in the art. As indicated in Example 2, a temporary support used in this process may have a surface so patterned as to form the projections during this process. The temporary support need not be a fabric; it may, for instance, be a coagulant-permeable plastic having apertures, or valleys, for forming the projections. The microporous structure generally has a specific gravity in the range of about 0.3 to 0.5; preferably at its upper portion (to which the skin is to be adhered) its specific gravity is in the range of about 0.3 to 0.4. As indicated previously, the microporous layer, whose thickness is preferably within the range of about 10 to 50 mils, such as about 20, 30 or 40 mils, (about ¼ to 1¼mm) may be made by slitting a thicker coagulated sheet (which may, for instance, be 1, 2 or 3 mm thick), thereby exposing, at the slit surfaces, the interior structure of the coagulated material. That interior structure is often more open and more uniform than the structure at the original outer surfaces of the thicker coagulated sheet. It is preferred to arrange the microporous layer in the laminate so that a slit microporous surface is at the outside (to receive the skin and/or embossing) and the original surface (if any) of the sheet is at the inside, adhered to the fibrous layer. One may also use a sheet made by coagulation of a layer (of polyurethane solution) which is sufficiently thin to provide the desired 10 to 50 mil sheet thickness directly, without slitting; in that case the outside surface of the microporous layer of the laminate may have, of course, a coagulated surface structure. The structure of a surface of that type is seen in FIGS. 3 and 4 of Civardi et al U.S. Pat. No. 3,764,363, which are plan views of the surface and in FIG. 2 of that patent, where the cross-section at the surface is shown. Comparison of those views with FIGS. 1 and 2 of this application shows that the coagulated surface structure is less open and the cavities just below the surface are partially covered by a micro-apertured skin. Experiments thus far indicate that in the embossing of a laminate having a microporous layer whose outside surface has the less open coagulated structure it is preferable to maintain the embossing roll at a lower temperature (e.g. at about 155°-160° C.) and the pressure at the nip at a higher value (e.g. some 100-200% higher such as at about 15 pounds per lineal inch) than is the case for the slit-surfaced material; in one run the post-nip residence time on the hot roll is about 10 seconds.

The preferred polyurethanes for the microporous material are those described in U.S. Pat. No. 3,709,864, particularly those having nitrogen contents above about 4%, more preferably containing about 4½% N. Usually the melting-sticking temperature of the microporous polyurethane is well above 120° or 130° C. and below 200° C. such as about 155° to 175° C.

In the foregoing Examples the fibrous sheet is a needle-punched nonwoven fabric containing a binder. The binder (e.g. in amount of 2 to 40%) aids in bonding the fibers of the fabric together (e.g. one may use a nonwoven fabric whose fibers have been treated with a latex of an elastomer, such as butadiene-acrylonitrile copolymer, as is well known in the art). The fibers of the nonwoven fabric may be interlaced in other ways, e.g. by entangling fibers with water jets, the fabric being held together solely by the fiber to fiber friction; also the fibers may be interlaced into a woven or knitted fabric (e.g. two layers of a nonwoven fibrous structure may be needle punched through a central reinforcing open weave, scrim, fabric). The fibrous fabric may be woven or knitted (e.g. of multifiber yarns) and in that case it is desirable that the fabric face being laminated have exposed individual fibers or small groups of fibers which can become embedded in the fused projections of the microporous material; thus a surface of a woven fabric may be sanded, or otherwise treated, to raise a light nap of spaced individual fibers thereon. A fabric of the type described in U.S. Pat. No. 3,988,488 having a bonded nap (on the side opposite that facing the microporous layer) may be employed; here again it may be desirable to nap, at least lightly, the un-napped face (FIG. 5 of U.S. Pat. No. 3,988,488) before laminating, so as to facilitate embedment of fibers into the fused projections. The fabric is preferably such as to impart additional strength to the microporous material, or in some cases to provide the principal tensile strength of the laminate. Preferably also its presence imparts to the laminate a higher tangent modulus at 15 or 20% elongation, a property which appears to be significant in the consistent lasting of shoe uppers.

One type of preferred fabric is a nonwoven structure of entangled or ligated individual fibers (e.g. of about 1 to 5 denier) having a high degree of "vertical" entanglement and interlocking (which is produced by needling a batt of staple fibers, either by the use of solid needles, usually having fiber-moving barbs, as in U.S. Pat. Nos. 3,090,099, 3,090,100, and 3,206,351, or by the use of fluid needling jets as in U.S. Pat. Nos. 3,214,819; 3,485,706, 3,508,308 and 3,620,903); preferably the fabric has little or no binder which would tend to stiffen the fabric and make it less pliable (less than 30% binder and more preferably below 20%, e.g 0, 5 or 10% elastomeric binder). Certain fabrics of this type, such as those sold under the names Nexus and Sontara, usually are anisotropic, having considerably higher strengths and moduli in the "machine direction" than in the cross direction; these may be reshaped to make them more isotropic in use or they may be used without reshaping. In the latter case the laminated product will be cut anisotropically (as is done with the leather customarily used for shoe uppers), by the shoe manufacturer, into shoe upper blanks in which the lasting-pulling direction corresponds to the machine direction of the fabric. In either case, the laminate will have a tangent modulus at 15 or 20% elongation in the lasting-pulling direction which is significantly higher (e.g. 50% or 100% higher) than that of the microporous layer alone, whether measured at room temperature (e.g. 23° C.) or at elevated temperature (e.g. dry at 80° C. or in steam at 100° C.). The fibers are generally close together; thus as can be seen in FIG. 3 a plurality of individual fibers may become embedded within a small portion of fused material, on laminating. The Nexus and Sontara fabrics usually have high elongations at break (e.g. about 50% or more even in the machine directions).

Another fibrous fabric which may be employed is the material described as a "melded fabric" in the article on "Cambrelle Melded Fabrics" by Sudnik which appears at pages 34–39 of Textiles (pub. by Shirley Institute) June 1976 or described in British Pat. No. 1,245,088.

The fibrous web employed in Examples 1 and 2 has a high degree of fiber entanglement resulting, in part, from the use of a high density of needle punches, and also has a substantial degree of fiber bonding, owing to the presence of the binder; its woven scrim is situated between two layers of fibers. It has been found, surprisingly, that one may obtain very good results by the use of a fibrous web in which the degree of fiber entanglement is very appreciably lower, in which there is substantially no binder and in which the scrim may be omitted, or situated as before, or situated at or just below the surface of the web. As shown in Example 9 below, the fibrous web may have a very low specific gravity prior to laminating, and the heat and pressure of the laminating process may itself be employed to densify the fibrous layer. This makes it possible to employ very economically produced loose fibrous webs (such as needle-punched webs having specific gravities well below 0.2, (e.g. below 0.15 or even below about 0.1) with attendant significant cost savings.

EXAMPLE 9

A. A loose fluffy staple fiber batt weighing about 4 ounces per square yard (about 100 g/m$^2$) and having a thickness of (very roughly) about 2 to 3 mm, as viewed from a cut edge thereof, is needle punched to a square-woven open scrim of yarns (woven about 8 ends per cm in each direction) weighing about 1.7 ounces per square yard (about 40 g per square meter). The needle punching is effected by means of the usual barbed reciprocating needles. Each needle is pushed into the batt (from its face which is not in contact with the scrim) in one direction (say "upward"); its barbs engage or more of the fibers and it thus forces those fibers through the batt and through the openings in the scrim. Then the needle is moved in the opposite direction (say "downward") and thus withdrawn back through the scrim and fiber batt, leaving fiber loops extending through the scrim and forming a sort of nap (principally of loops) on the free face of the scrim. The barbs are small pointed or flared extensions or projections of the needle; they are open "upward" to catch fibers on the "upward" stroke and leave them in place on the "downward" stroke. There are about 300 to 350 more or less randomly located needle punches per square inch of the batt surface. The needle punching causes about $\frac{1}{2}$ oz/yd$^2$ of staple fiber to project from, or lie on, the free face of the scrim.

Figure 25:
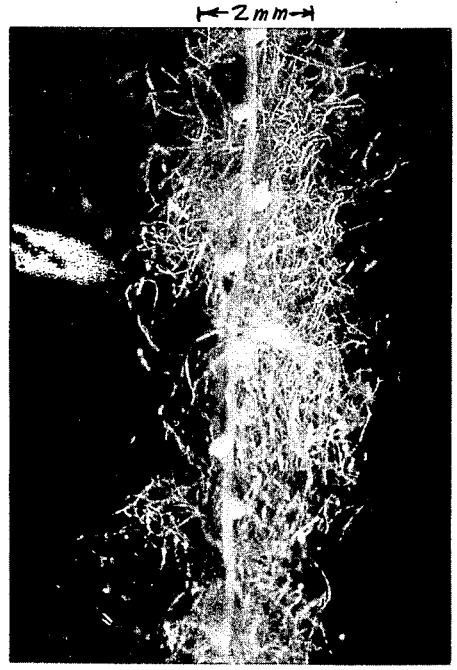
FIGS. 25 and 25A are cross-sectional views of a needle-punched fibrous material.

The staple fiber batt is made of conventional polyester (polyethylene terephthalate) staple fibers of about 2 denier per filament about 1½ to 3 inches long; the fibers are crimped, as in conventional, as seen in FIG. 25, having about 12 crimps per inch. The scrim is woven of yarns made of polyester staple fibers.

The scrim face of the needle-punched material is laminated to a web of microporous polyurethane about 20 mils thick having a specific gravity of about 0.33 and having the microporous structure shown in FIGS. 1 and 2, made by mechanically slitting a thicker sheet as described in Example 1. The laminating is effected as in Example 1 or 2, using the macro-apertured web of elastomeric polyurethane. The resulting laminate has excellent strength, softness and tear resistance, despite the relatively small extent of fiber entanglement (the density of needle punches, about 300–350 per square inch, is much less than that employed in the making of the needle-punched material used in Examples 1 and 2). This indicates that the bonding at one face, by the lamination, greatly improves the coherency and strength of the relatively loose needle punched material. The fibrous material is compacted considerably; the thickness of the laminate is about 48 mils while the thickness of the original needle-punched fibrous structure is about 86 mils (as measured with an Ames 560 series thickness gauge according to ASTM D1814-70).

Figure 26:
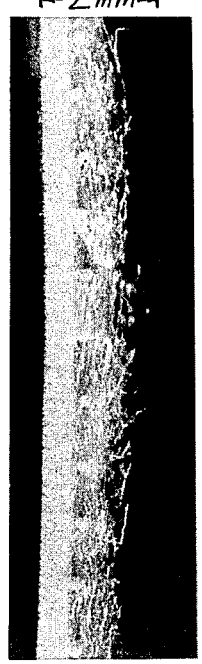
Figure 26A:
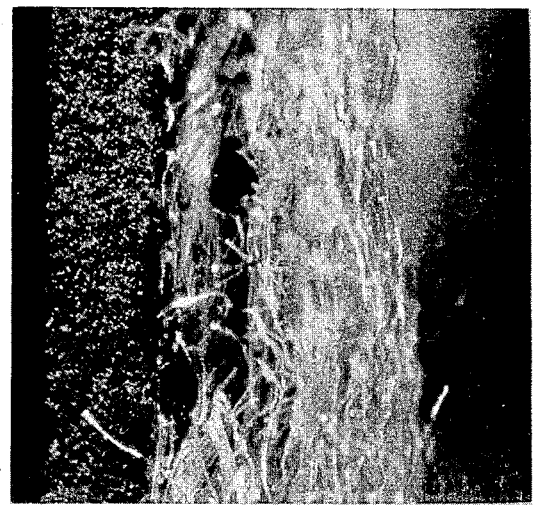

FIGS. 25 to 26A are photomicrographs, all taken edge-on, with a light microscope, of the needle punched material of this Example.

Figure 25A:
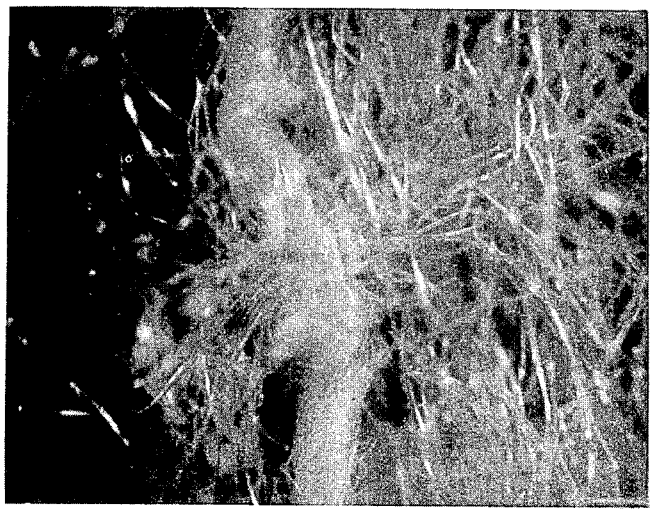

In the view at low magnification, FIG. 25, the general arrangement of fibers and scrim before lamination is apparent. In FIG. 25A which shows a portion of the same structure, at higher magnification, one can see a group of fibers which have been acted on by the punching needle to more or less align them transversely to the web and to force them through the scrim.

Figure 27:
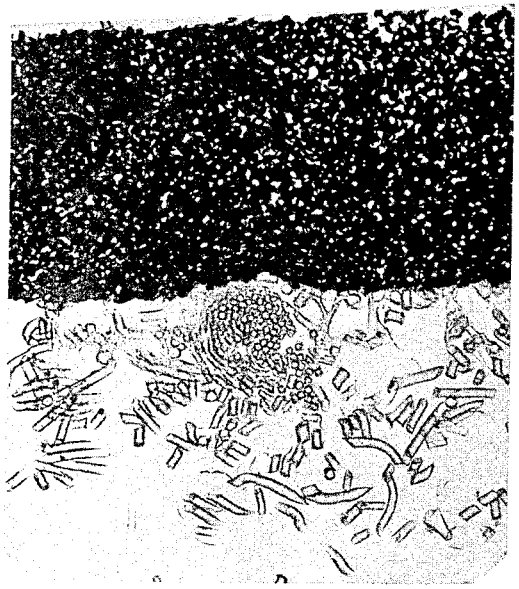
Figure 28:
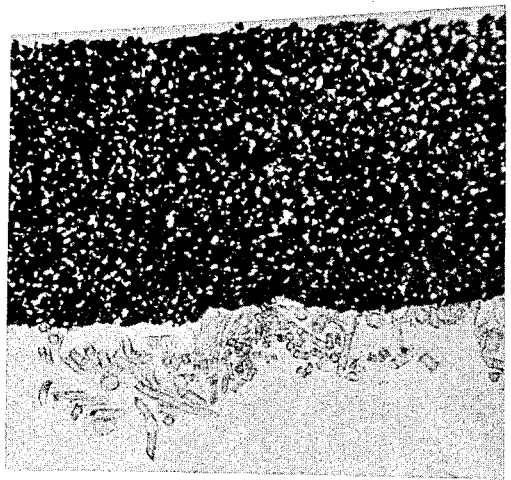
FIGS. 28 and 28A are specially prepared views of the same material illustrating the bonding.
Figure 27A:
Figure 28A:
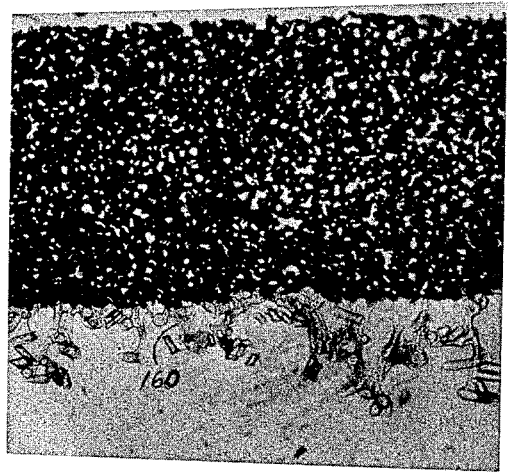

The laminate is seen at the same two magnifications in FIGS. 26 and 26A. The bonding effect that the lamination has on the fibers is seen in FIGS. 27 to 28A. FIGS. 27 and 27A are views of thin cross-sections made by embedding the laminate in a water-soluble medium and then making a slice with a microtome; the tight cluster of fibers at the center of each view is a thread of the scrim. FIGS. 28 and 28A show the same cross-sections after the water-soluble embedding material has been dissolved away; it will be seen that fibers are still bonded to the microporous material M by fingers of adhesive (as at 160) which extend some distance into the fibrous structure and encapsulate portions of the fibers. It will be understood that in most cases these encapsulated portions are parts of individual fibers which (out of the planes of the thin slices shown in FIGS. 28 and 28A) extend transversely through the fibrous web (although some of the encapsulated portions are parts of individual fibers of the scrim threads which extend longitudinally of that web). Thus when one gently teases individual fibers from the fibrous side of the laminate, one end of the teased fiber generally remains anchored to the laminate; in contrast one can readily tease out and remove (without fiber breakage) individual fibers of the needled material before laminating.

B. The lamination of Examples 9A may be effected as described in the Examples of Ser. No. 834,857.

C. Example 9A is repeated using about 250 to 300 needle punches per square inch and impregnating the needle-punched structure with about 5 or 10% of its weight of an elastomeric binder (e.g. a butadiene-acrylonitrile rubber) which is applied as an aqueous latex and then cured.

D. Example 9C is repeated using about 500 needle punches per square inch.

E. Examples 9A–9D are repeated using a microporous material about 30 mils (instead of 20 mils) thick.

In the laminating procedure used in this Example 9, the loose fibrous web is passed under tension around a hot roll having a temperature of, say, about 345° to 380° F. (about 170° to 195° C.) and then through the nip between the hot roll and the locally deformed rubber surface of the backup roll. It is known that at these temperatures a batt of polyester staple fibers tends to shrink. In the procedure used herein the batt is restrained against shrinkage in area (as by the pressure exerted thereon by the tensioned microporous sheet and, then by the nip pressure and the anchoring and binding action of the macroapertured adhesive, as well as the stabilizing effect of the scrim). In the nip, owing to the deformation of the rubber surface of the backup roll and the consequent variations in the linear speed of that surface, the compressed assemblage of batt and microporous material may be subjected to shearing forces, first in one direction and then in the other, which may have some compacting or felting effect on the batt.

The needle punched structure used in this Example 9 contains (as previously mentioned) about 4 ounces per yard of relatively loose staple fibers (not counting the staple fibers which are in twisted compacted form in the yarns of the scrim) and is about 86 mils thick; the specific gravity of the loose staple fiber in the needle-punched structure is thus well below 0.2, i.e. below 0.1, specifically about 0.07. In the process this loose staple fiber becomes compacted and set, so that the specific gravity of the loose staple fiber in the final product is well above 0.15, i.e. above about 0.2, specifically about 0.24.

As previously noted, products of various thicknesses may be produced by the system described herein. Generally for shoe uppers an overall laminate thickness within the range of about 40 to 80 mils (about 1 to 2 mm) is desirable for men's shoes and an overall thickness within the range of about 35 to 50 mils (about 0.8 to 1.2 mm) is desirable for women's shoes. For upholstery it may be about 20 to 40 mils (about 0.5 to 1 mm).

As previously noted, in the preferred process a thin preformed skin is laminated to the outer surface of the microporous layer, or that outer surface is directly embossed without a skin (giving a product having a dull, suede-like appearance). Alternatively, the outer surface of the microporous layer may be finished in other ways before or after it is laminated to the fibrous material. Thus a thin skin (as of elastomeric polyurethane) may be applied by spraying or printing. The presence of this skin usually reduces the moisture vapor transmission somewhat; for instance a material finished in this way may have an MVT of about 70 after finishing, as compared to an MVT of about 200 g/sq.m./hr. in the absence of the finish.

In the most preferred constructions according to this invention the fiber:elastomer weight ratio is in the range of about 0.8:1 to 1.2:1 such as about 1:1. (The weight of elastomer includes not only the weight of the microporous layer, which constitutes well over 50% of the weight of elastomer, but also the weight of binder that may be present in the fibrous layer which binder peferably makes up less than 30% of the total weight of elastomer). In the laminated product, the specific gravity of the fibrous layer (including any binder therein), is preferably below about 0.3, such as 0.28, 0.25 or 0.2, and above 0.1. This makes it possible to produce a shoe upper material whose lower layer is readily compressible in the shoe-making process (e.g. in lasting which involves significant bending of the shoe upper material at the toe portion, which bending compresses the fibrous underside of the shoe upper material) while also having sufficient cohesive strength to resist conventional shoe making forces without breaking. In such products the thickness of the microporous layer is, as previously mentioned, in the range of about 20 to 35 or 40 mils, and the thickness of the fibrous layer is at least about 20 mils such as about 25, 30, 40 or 50 mils or more. Preferably the total amount of fibers is in the range of about 2 or 3 to 6 ounces per square yard (such as may be provided by using a scrim weighing about 1 to 2 or 3 [e.g. 1½] ounces per square yard, into which about 2 to 3 or more ounces per square yard of staple fiber have been punched) and the amount of added impregnant or binder, if any, is about ½ ounce or less per square yard.

The weight of elastomer supplied in the macroreticulated web is preferably in the range of about 0.4 to 0.8 ounce (more preferably about 0.6 ounce) per square yard.

In the following Examples the fibrous sheet is a combination of a cellular elastomeric sheet (such as the microporous sheets previously described) and a nonwoven fiber batt having fibers of said batt extending transversely into said elastomeric sheet.

EXAMPLE 10

In this Example a thin sheet of microporous elastomeric polyurethane is combined with a nonwoven polyester staple fiber web by needle punching fibers of the web into the microporous sheet. The microporous sheet is like that used in Example 1 except that its thickness is about 15 mils (⅜ mm). The nonwoven fiber web is the same loose fluffy batt (weighing about 4 ounces per square yard) used as a starting material in Example 9 and the needle-punching is effected in the manner generally described in Example 9 except that the fibers are punched into and through a microporous sheet. During the "upstroke" each needle punches a crater into the "lower" face of the microporous sheet and thus tears the microporous material locally, forming a small resilient flap or flaps of the elastomeric polyurethane; the flap presses against the fiber(s) is the hole to hold them frictionally. FIGS. 29 and 30 show the appearance of the "lower" and "upper" faces (respectively) of a microporous sheet from which the fibers have been removed mechanically (by peeling the fibrous batt away from the microporous sheet thereby pulling the frictionally held needled fibers back out of their holes in the microporous sheet). FIGS. 31, 31A 32 show the needled fibers held in the holes. The needling is carried out to form about 300 to 350 more or less randomly positioned holes per square inch of the microporous sheet.

EXAMPLE 11

Example 10 is repeated except that a woven scrim of polyester fiber is placed between the nonwoven batt and the microporous sheet before needling, so that the resulting needled fibers are punched through the openings in the scrim and then into the microporous sheet and thus serve to hold the whole assemblage together. The scrim used in this Example is the same squarewoven scrim described in Example 9. The presence of the scrim results in a laminate having a greater stability and a higher modulus at low elongations.

EXAMPLE 12

Examples 10 and 11 are repeated, except that the microporous sheet to which the batt is needled is 30 mils thick and the number of needle punches is about 600–800 per square inch and the distribution of the needle holes is such that a criss cross overall pattern (of fibrous material) is apparent on the "lower" face of the microporous sheet with areas which are essentially fiber-free (or of much lower fiber density) readily visible, between the criss-crossing lines.

In the needle-punching of the microporous material the "upward" strokes of the needles may be such that they move to positions considerably above (e.g. ¼ inch or more above) the "upper" surface of the microporous material, so that there is a considerable length of fiber on the upper face; these lengths tend to form curls of fibers (FIG. 32) unless brushed out. Alternatively the upward strokes may terminate a much shorter distance above that upper surface or all (or some of) those upward strokes may even terminate within the microporous material so that the fibers (e.g. fiber loops) are retained within the material without being exposed at that upper surface.

The number of needlepunches per square inch will generally be well over 100 and is preferably over 200, such as about 300, about 400, about 500 or even more.

The needle punching may be effected so that only a relatively small amount of fiber is present on the "upper" surface of the microporous material, e.g. about 0.2 to 1 (such as about 0.4 to 0.6) oz./yd.$^2$.

The "upper" partly fibrous surface of the needle-punched microporous material (such as the materials of Examples 10-12) may be treated in various ways. For instance it may be subjected to a heat-embossing treatment (as in Example 3) and, in that case, the heat, time and pressure conditions may, if desired, be such as to form a thin-polyurethane skin by fusion and/or compaction of the upper surface of the microporous material, and thereby improve the bond between microporous material and fibers. Alternatively, that partly fibrous surface may be treated (as in the manner described in Examples 4 to 7) to laminate a thin surface skin directly thereto. Such skin may (optionally) be heat-embossed, as described above, to give it a leather grain pattern. In a particularly suitable laminating technique a layer of discontinuous or open elastomeric thermoplastic material more than one mil thick (such as a layer of the macro-apertured elastomeric thermoplastic web, e.g. the 4 mil thick web used in Example 1) is positioned between the skin and the "upper", partly fibrous, surface of the needle-punched microporous material; the passage over the hot roll fuses the macro-apertured web material to the exposed fibers and to the polyurethane at that upper surface and also bonds the skin. In preliminary experiments, the latter technique appears to give a stronger bond between the skin and microporous material and the unevenness due to the presence of clumps of fibers just below the skin is much less noticeable. Alternatively the preformed macro-apertured web may heat-adhered to "upper" surface of the needle-punched microporous sheet in the manner just described, but replacing the skin by a web of material to which the macro-apertured material does not adhere, (such as a web of release paper or of plastic foil). The non-adherent web serves as a medium through which the heat of the roll is transferred to fuse the macroapertured thermoplastic web; it is stripped off after the macro-apertured adheres to, and bonds together, the fibers and microporous surface. If desired a skin may thereafter be applied to the resulting bonded "upper" surface and, optionally, embossed.

The "upper" surface of the needle-punched microporous material may be modified in other ways. It may be treated to melt back the protruding surface fibers, thus forming fused nubs at the fiber ends; the presence of these nubs makes it more difficult to pull these fibers out through the microporous material and thus strengthens the physical bond between the fibrous batt and the microporous material. Such fiber-melting treatments may be effected by flaming (or infra-red heating) without significantly affecting the microporous material. One may also subject the "upper" surface of the needle-punched microporous material to influences which tend to fuse or soften the microporous material, such as infrared heating or flaming of that surface with or without preliminary treatment of that surface with an agent which lowers the fusion temperature (e.g. a solvent such as dimethyl formamide). The protruding fibers at the "upper" surface of the needle-punched microporous material may also be abraded (as by sanding, to break the protruding loops of fiber) or brushed (to pull out such loops) thereby providing a nap having numerous free fiber ends; this nap may, if desired, be sheared in conventional manner, to a uniform nap length or thickness with or without preliminary or subsequent bonding (as described earlier) of the fibers to the microporous surface. A skin may be applied (in the manner previously described) to any of these modified surfaces.

Before or after (or during) the operation of needle-punching the batt to the microporous layer, the batt may be treated to increase its coherence as by applying a binding agent, e.g. up to about 40%, such as 5, 10, or 20% of binding agent such as an elastomeric latex (previously described) or solution.

The treated (or untreated) needle-punched microporous material may be used in various ways. For instance, it may be used as a lining for shoes, e.g. with the material arranged so that the less fibrous ("upper") face of the material, with or without a skin, is the exposed, visible face of the lining.

In the operation of the system described herein, very good results have been obtained by using fibrous layers comprising fibers of polyethylene terephthalate. It will be understood that other fibers such as nylon (e.g. nylon 66), polyolefin (e.g. polypropylene), rayon, or polyacrylonitrile (e.g. Orlon) be employed.

Also, while very good results have been obtained with macro-apertured webs of elastomeric polyurethane, it will be understood that other thermoplastic elastomers may be employed, such as the polymers of diolefins sold as Kraton (a butadiene-styrene copolymer) and Solprene. Preferred thermoplastic elastomers set to a bond which is resistant to steam treatment; such treatment may be used in processing lasted shoe uppers. Their melting-sticking temperatures are preferably above 100° C., more preferably above about 110° C. Reactive elastomers which become cross-linked on heating during the processing of the laminate may also be used.

The skin material preferably comprises elastomeric material, preferably a polyurethane or a polyacrylate, and is preferably substantially free of solvent. Preferably, also, the outer, visible, portion of the skin is resistant to discoloration on exposure to air, light, heat, etc. Other components may also be present in the skin and these need not be elastomeric (see, for instance the uppermost layer in FIG. 20A and note the "top coating" materials employed in U.S. Pat. No. 4,073,984). Excellent results are obtained with thermoplastic skins, including those whose melting-sticking temperatures are about the same as, or even higher than that of the microporous material and those whose melting-sticking temperatures are well below that of the microporous material and well below the temperature of the hot embossing roll. For instance, polyurethane materials, such as described in Example 4 above, may have melting-sticking temperatures of about 130° C. When the process involves bringing the skin-contacting surface of the microporous material up to its melting-sticking temperature (as is the case in the preferred grain-embossing process), or higher, the skin material may be a cross-linked non-thermoplastic polymer (or a polymer having a higher fusion temperature) since adhesion to the microporous material may then be obtained by fusion of the latter; accordingly the skin may comprise a layer of cross-linked polyurethane or polyacrylate. As noted there may be a release agent in or on the skin; this may be a readily fusible material which may form a non-tacky liquid film (such as a wax) or a finely divided material such as a flatting agent (e.g. a silica gel or silicate flatting agent of conventional type) that reduces the tackiness and adhesion of the heat-softened material. Of course the hot rolls may be coated with a non-adhering type of polymer such as a tetrafluoroethylene polymer (e.g. Teflon).

The melting-sticking temperature mentioned herein may be measured on a standard Fischer-Johns melting point block and indicate the temperatures at which the materials stick noticeably to the thin glass cover slip of the block. The measurements with microporous materials (particularly those which have a very open surface structure as shown in FIG. 1 and thus have very little material directly in contact with the hot glass) are carried out under conditions providing (a) light pressure on the material, (b) insulation to reduce cooling of the subsurface portions owing to loss of heat by convection (or otherwise) through the microporous open-cell material and (c) sufficient time for subsurface portions to be affected by the temperature of the hot glass. For example the pressure may be provided by a one pound weight exerting its force (through the light insulating layers) on a round piece of the material (about 18 mm in diameter, so that the pressure is about 45 g/cm$^2$) resting on the hot glass. The insulation may be provided by placing several layers of the microporous sheet material above the sample (so that the total thickness of the layers of microporous material is about 0.1 inch) while underneath the one pound weight there is a thin layer of silicone rubber resting on a thin glass cover slip which in turn rests on the top of those layers of microporous material. In tests in which the assembly is kept for 5 minutes each at melting point block temperatures of 160°, 165°, 170° and 175°, it is found that slight sticking (requiring one to lightly peel off the material to separate it from the hot glass) occurs at about 160° to 170° C. and strong sticking occurs at about 170° C.

In the foregoing Examples the heat for activating the adhesive material has been supplied by heat transfer through one of the two layers which are being laminated together. The heat may be applied in other ways, as by the technique (e.g. using a flame) described in the previously mentioned Civardi application Ser. No. 834,857 filed Sept. 19, 1977.

A particularly useful laminating technique involves bringing the thermoplastic macro-apertured web into contact with a hot moving surface of a continuously rotating roll. This is described in the application of Civardi et al Ser. No. 19,235 filed Mar. 9, 1979, now abandoned, whose entire disclosure is incorporated herein by reference. In that procedure the thermoplastic macro-apertured web is preferably pressed by the fibrous web against the hot surface to such an extent that portions of the thermoplastic polymer adjacent to the fibrous web penetrate into the fibrous web and are molded around surface fibers thereof while molten portions of the thermoplastic polymer remain exposed at the surface of said fibrous web. Then (within 5 seconds of the time the macro-apertured web comes into contact with the hot surface of the roll) the fibrous web is continuously peeled away from the hot roll surface so that the fibrous web removes, from the hot roll surface, the thus-molded portions of the thermoplastic polymer and at least part of the molten exposed portions. Then the microporous sheet is brought into bonding contact with those molten exposed portions.

In the foregoing Examples, the embossing step (e.g. to provide the leather-like grain) is carried out on the laminate of microporous layer and fibrous web. It is within the broader scope of the invention to emboss the microporous material, in the same way, but before it is laminated to the fibrous web. Preferably a skin is applied to that microporous material, in the manner described above, prior to such embossing. Thus a grained, colored, finished microporous sheet is produced which can be stored and transported, if desired, to another location where its ungrained side can then be laminated to a fibrous web, e.g. in the manner described in the above-mentioned application Ser. No. 19,235 of Mar. 9, 1979.

The embossing and laminating may be carried out simultaneously, preferably by modifying the laminating procedure described in said Ser. No. 19,235 so that the microporous sheet is brought into bonding contact with the molten exposed portions of thermoplastic polymer (on the fibrous web) while the microporous sheet is travelling around the hot surface of an embossing roll. Thus the arrangement may be like that shown in FIG. 24 except that the microporous layer 102 comes into contact with the fibrous layer at, or just before, passing through the nip between rolls 11 and 12. The microporous layer which is being embossed (and laminated) in that manner may carry no skin (as in Example 3) or it may have had a skin previously adhered thereto (as in Examples 4 and 7) or the skin may be applied on the embossing roll (as in Examples 5 and 6, as with a Mylar or other skin-carrying film.)

It is understood that the foregoing detailed description is given merely by way of illustration and that variations may be made therein without departing from the spirit of the invention.

We claim:

1. Process for imparting a grain pattern to a continuous sheet material having a layer of microporous polyurethane at least about 10 mils thick which comprises passing said sheet material continuously to the nip between a roll having a hot grain-embossing surface having hot grain-embossing projections and another roll, compressing said layer in said nip and thereby forcing said projections into said layer, passing said sheet material out of said nip and maintaining said sheet material on said grain embossing surface to transfer heat from said projections into said layer while said layer is substantially uncompressed, said hot surface being at a temperature which is within about 15° C. of the melting-sticking temperature of said layer, and then continuously removing said sheet material from said hot roll.

2. Process as in claim 1 in which said microporous polyurethane has a melting-sticking temperature of at least about 130° C.

3. Process as in claim 1 in which said melting-sticking temperature is about 155°–185° C.

4. Process as in claim 1 in which said microporous layer has a void volume over 50%, is composed of walls of elastomeric material around its voids, the temperature of said hot surface being such that if the sheet material remained compressed in the nip for some time said layer would become permanently compacted, the rate of travel of the material and its effective path length in said nip being so short that such compaction is substantially avoided.

5. Process as in claim 4, in which said sheet material comprises said layer and a fibrous fabric layer bonded thereto, said microporous layer being about 10 to 50 mils thick, said fibrous fabric layer has a specific gravity below about 0.3 and above 0.1, and said microporous layer has an elastomeric substantially continuous skin of a thickness less than about 20 microns between said hot surface and said microporous layer.

6. Process as in claim 1 in which said layer has an elastomeric substantially continuous skin of a thickness less than about 15 mils between said hot surface and said layer.

7. Process as in claim 6 in which said skin is below 20 microns in thickness.

8. Process as in claim 7 in which said skin does not fuse at the temperature of said hot surface.

9. Process as in claim 7 in which said skin is thermoplastic and the temperature of said hot surface is above the fusion temperature of said skin.

10. Process as in claim 9 in which said skin carries a release agent.

11. Process as in claim 1 in which the residence time of said sheet material in said nip is less than about 0.1 second and its residence time on said hot surface while substantially uncompressed is at least about ½ second.

12. Process as in claim 11 in which the residence time in said hot nip is so short that said microporous layer recovers to substantially its original thickness in said process.

13. Process as in claim 11 in which said microporous layer has a specific gravity of about 0.3 to 0.5.

14. Process as in claim 13 in which said sheet material comprises said layer and a fibrous fabric layer bonded thereto, said microporous layer being about 10 to 50 mils thick.

15. Process as in claim 13 in which said grainembossing surface has a pattern of vein-forming ridges about 5 to 15 mils in height and hair cell-forming knobs of lesser height.

16. Process as in claim 15 in which the height of said knobs is about ½ to 1 mil.

17. Process as in claim 13 in which said fibrous fabric layer has a specific gravity below about 0.3 and above 0.1.

18. Process as in claim 17 in which said microporous layer has an elastomeric substantially continuous skin of a thickness less than about 20 microns between said hot surface and said microporous layer.

* * * * *